US012688392B2

(12) United States Patent
Tsuchida et al.

(10) Patent No.: US 12,688,392 B2
(45) Date of Patent: Jul. 21, 2026

(54) WIRELESS TAG COMMUNICATION APPARATUS, WIRELESS TAG COMMUNICATION SYSTEM, AND COMMUNICATION METHOD FOR A WIRELESS TAG COMMUNICATION APPARATUS

(71) Applicant: Toshiba Tec Kabushiki Kaisha, Tokyo (JP)

(72) Inventors: Sunao Tsuchida, Mishima Shizuoka (JP); Jun Yaginuma, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 82 days.

(21) Appl. No.: 18/768,736

(22) Filed: Jul. 10, 2024

(65) Prior Publication Data

US 2025/0181879 A1 Jun. 5, 2025

(30) Foreign Application Priority Data

Dec. 1, 2023 (JP) ................................. 2023-203862

(51) Int. Cl.
*G06K 19/077* (2006.01)

(52) U.S. Cl.
CPC . *G06K 19/07758* (2013.01); *G06K 19/07713* (2013.01)

(58) Field of Classification Search
CPC ....... G06K 19/07758; G06K 19/07713; G06K 7/10009
See application file for complete search history.

(56) References Cited

U.S. PATENT DOCUMENTS

| | | | | |
|---|---|---|---|---|
| 6,433,787 B1 * | 8/2002 | Murphy | ................. | G09G 5/363 |
| | | | | 345/558 |
| 8,174,365 B2 * | 5/2012 | Akiyama | ................. | H04B 5/77 |
| | | | | 340/10.2 |
| 8,199,551 B2 * | 6/2012 | Matsuzaki | .......... | G11C 11/4023 |
| | | | | 365/72 |
| 8,510,399 B1 * | 8/2013 | Byttow | ............... | H04L 12/1822 |
| | | | | 707/771 |
| 8,700,719 B1 * | 4/2014 | Covitz | ................. | G06Q 10/107 |
| | | | | 709/204 |
| 8,819,150 B1 * | 8/2014 | Osinga | ................ | H04L 12/1813 |
| | | | | 709/204 |
| 10,740,574 B1 * | 8/2020 | Stanford | ............ | G06K 7/10217 |

(Continued)

FOREIGN PATENT DOCUMENTS

JP 2010-021901 A 1/2010

*Primary Examiner* — Curtis J King
(74) *Attorney, Agent, or Firm* — Kim & Stewart LLP

(57) ABSTRACT

In accordance with an embodiment, a wireless tag communication apparatus transmits a read command designating a first state as a flag state of a wireless tag. The wireless tag communication apparatus acquires identification information returned from a wireless tag whose flag state is the first state. In the wireless tag communication apparatus, a determination unit determines, on the basis of the acquired identification information, whether or not a position of the wireless tag that has returned identification information has been detected, and instructs the wireless tag whose position has been detected to rewrite the flag state to a second state by a wireless communication device.

12 Claims, 16 Drawing Sheets

(56)        References Cited

U.S. PATENT DOCUMENTS

| | | | | |
|---|---|---|---|---|
| 11,436,420 | B2 * | 9/2022 | Trivelpiece | G08B 13/2417 |
| 2004/0145454 | A1 * | 7/2004 | Powell | G06K 7/10039 |
| | | | | 340/10.2 |
| 2010/0085792 | A1 * | 4/2010 | Matsuzaki | H10B 12/09 |
| | | | | 365/72 |
| 2010/0181384 | A1 * | 7/2010 | Matsuzaki | H03K 19/00 |
| | | | | 257/679 |
| 2010/0241749 | A1 * | 9/2010 | Rasmussen | H04L 51/046 |
| | | | | 715/255 |
| 2015/0195221 | A1 * | 7/2015 | Rasmussen | H04L 51/216 |
| | | | | 715/753 |
| 2015/0269818 | A1 * | 9/2015 | Jain | G08B 13/2488 |
| | | | | 340/572.1 |
| 2016/0180123 | A1 * | 6/2016 | Forster | G06K 7/10019 |
| | | | | 340/10.51 |
| 2019/0114449 | A1 * | 4/2019 | Duron | G06K 7/10019 |
| 2021/0073484 | A1 * | 3/2021 | Trivelpiece | G06K 7/10158 |
| 2021/0097826 | A1 * | 4/2021 | Trivelpiece | G08B 13/2485 |
| 2023/0419057 | A1 * | 12/2023 | McMillan | H04W 4/80 |
| 2024/0220750 | A1 * | 7/2024 | Frederick | G06K 7/10425 |
| 2024/0310508 | A1 * | 9/2024 | Li | H04B 7/22 |
| 2025/0184694 | A1 * | 6/2025 | Zong | H04W 4/70 |
| 2025/0184895 | A1 * | 6/2025 | Li | H04B 5/48 |

* cited by examiner

| Identification information | Detected information |
|---|---|
| ID 1 | ✕ |
| ID 2 | ✕ |
| ID 3 | ○ |
| ID 4 | ✕ |
| ⋮ | ⋮ |

| Identification information | Acquisition time | RSSI | Phase | Apparatus position | |
|---|---|---|---|---|---|
| ID1 | t1 | RSSI1 | Phase1 | P1 | ~23 |
| ID2 | t2 | RSSI2 | Phase2 | P1 | |
| ID3 | t3 | RSSI3 | Phase3 | P1 | |
| ID3 | t4 | RSSI4 | Phase4 | P2 | |
| ID1 | t5 | RSSI5 | Phase5 | P2 | |
| ID2 | t6 | RSSI6 | Phase6 | P2 | |
| ID1 | t7 | RSSI7 | Phase7 | P3 | |
| ID3 | t8 | RSSI8 | Phase8 | P3 | |
| ID2 | t9 | RSSI9 | Phase9 | P3 | |
| ID2 | t10 | RSSI10 | Phase10 | P4 | |
| ID4 | t11 | RSSI11 | Phase11 | P4 | |
| ID1 | t12 | RSSI12 | Phase12 | P4 | |
| ID3 | t13 | RSSI13 | Phase13 | P4 | |
| ⋮ | ⋮ | ⋮ | ⋮ | ⋮ | |

Fig.7

WIRELESS TAG COMMUNICATION APPARATUS, WIRELESS TAG COMMUNICATION SYSTEM, AND COMMUNICATION METHOD FOR A WIRELESS TAG COMMUNICATION APPARATUS

CROSS-REFERENCE TO RELATED APPLICATIONS

This application is based upon and claims the benefit of priority from the prior Japanese Patent Application No. 2023-203862, filed on Dec. 1, 2023, the entire contents of which are incorporated herein by reference.

FIELD

An embodiment to be described here generally relates to a wireless tag communication apparatus, a wireless tag communication system, and a communication method for a wireless tag communication apparatus.

BACKGROUND

In recent years, a technology in which a wireless tag referred to as a radio frequency identification (RFID) tag on which unique identification information has been recorded is attached to an item to be managed and the item is detected by reading the identification information from the wireless tag using a wireless tag communication apparatus that wirelessly communicates with the wireless tag and is referred to as an RFID reader has been used for various purposes.

In this technology, by simply transmitting a read command once from the wireless tag communication apparatus, identification information can be read from all wireless tags present in the communication area of the wireless tag communication apparatus. However, in reality, since misreading occurs due to various factors such as relative movement between the wireless tag and the wireless tag communication apparatus and reflection of radio waves, the wireless tag communication apparatus transmits a read command a plurality of times. For this reason, each read command causes identification information that has already been read to be read again, which reduces the chances of reading identification information that has not been read. The time it takes to complete reading of identification information of all wireless tags increases, and the reading rate per unit time decreases. In this regard, it has been known that this is prevented by instructing not to reset flag information of the wireless tag whose identification information is acquired once by a read command.

Incidentally, one of the uses of the wireless tag and the wireless tag communication apparatus is to take inventory of a large number of items stored on shelves in warehouses, store backyards, or the like and search for desired items. In such a use, it is necessary to not only detect an item but also detect the position of the item. In order to detect a position, it is necessary to read one wireless tag a plurality of times. However, reading a wireless tag whose position has been detected reduces the chances of reading a wireless tag whose position has not been detected. For this reason, in the case where a plurality of wireless tags whose position is to be detected, i.e., a plurality of wireless tags to be read, is present, it will take some time to read all the wireless tags.

BRIEF DESCRIPTION OF THE DRAWINGS

FIG. 6 is a schematic diagram showing a main data structure stored in a detection target storage unit included in the wireless tag communication apparatus according to the first embodiment.

FIG. 7 is a schematic diagram showing a main data structure stored in a read data storage unit included in the wireless tag communication apparatus.

DETAILED DESCRIPTION

Figure 1:
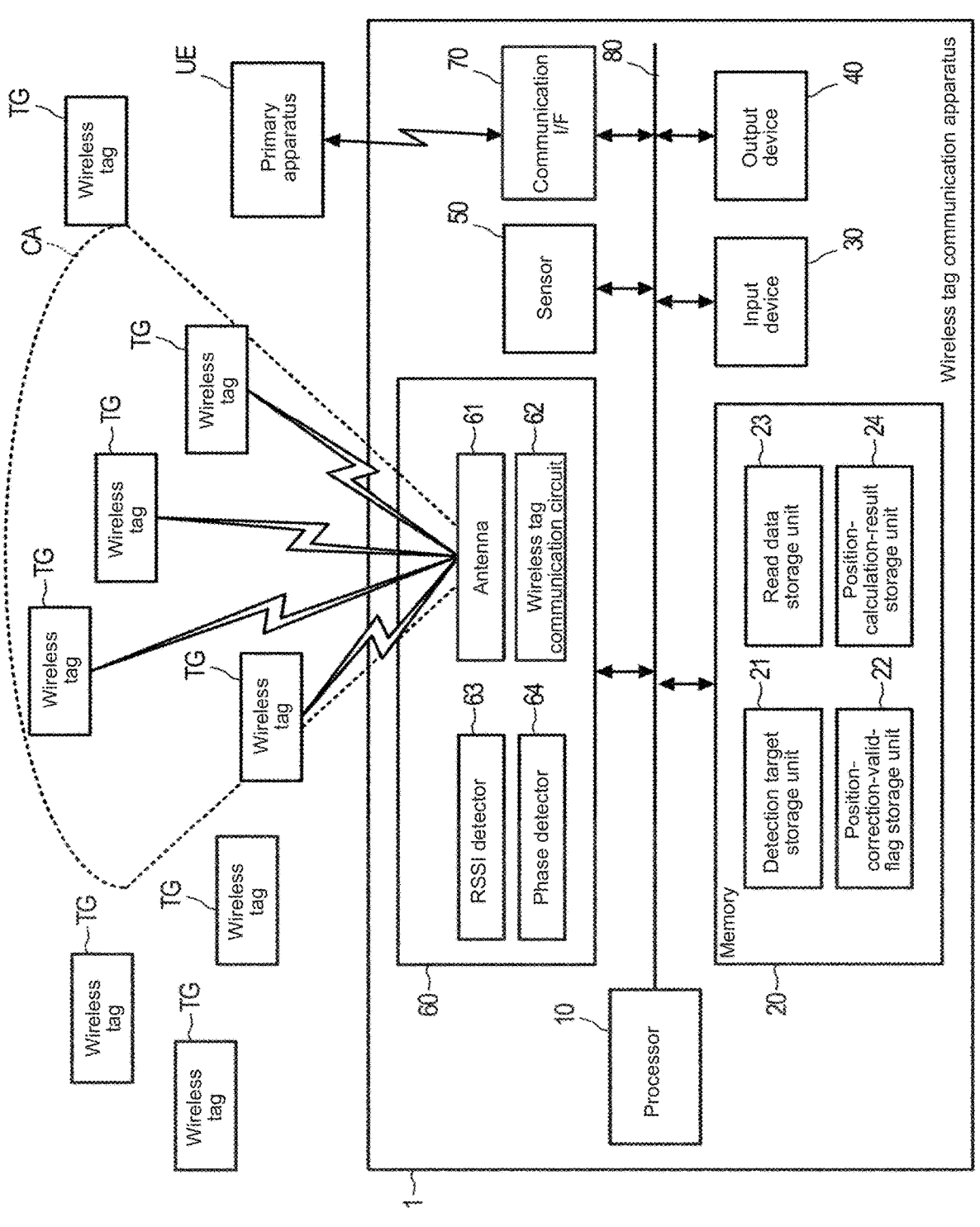
FIG. 1 is a schematic configuration diagram showing a wireless tag communication system according to a first embodiment.

In accordance with an embodiment, a wireless tag communication apparatus includes a wireless communication device and a processor. The wireless communication device transmits, to a wireless tag, a read command for reading identification information of the wireless tag and receives the identification information from the wireless tag. The read command designates a flag state stored in a flag of the wireless tag, the flag state being one of a first state and a second state. The wireless tag returns the identification information upon receiving the read command designating the flag state only where the flag state corresponds to the designated flag state. The processor is configured to transmit, by the wireless communication device, the read command designating the first state as the flag state and acquire, by the wireless communication device, the identification information returned from the wireless tag whose flag state is the first state. The processor is further configured to determine, on a basis of the acquired identification information, whether or not a position of the wireless tag that has returned the identification information has been detected. The processor is further configured to instruct, where the position of the wireless tag that has returned the identification information has been detected, the wireless tag that has returned the identification information to rewrite the flag state to the second state by the wireless communication device.

Hereinafter, embodiments will be described with reference to the drawings. In the drawings, the same reference symbols denote the same or similar portions.

First Embodiment

FIG. 1 is a schematic configuration diagram showing a wireless tag communication system according to a first embodiment. The wireless tag communication system according to the first embodiment includes a wireless tag communication apparatus 1 according to the first embodiment and a primary apparatus UE. The wireless tag communication apparatus 1 detects, from a plurality of wireless tags TG, a position of a wireless tag TG whose position is to be detected. The primary apparatus UE is an information processing apparatus that uses the position of the wireless tag TG whose position is to be detected, which is detected by the wireless tag communication apparatus 1.

Before describing each device, in order to facilitate understanding of this embodiment, a read operation of the wireless tag TG and a method of detecting a position of the wireless tag will be described first.

Figure 2:
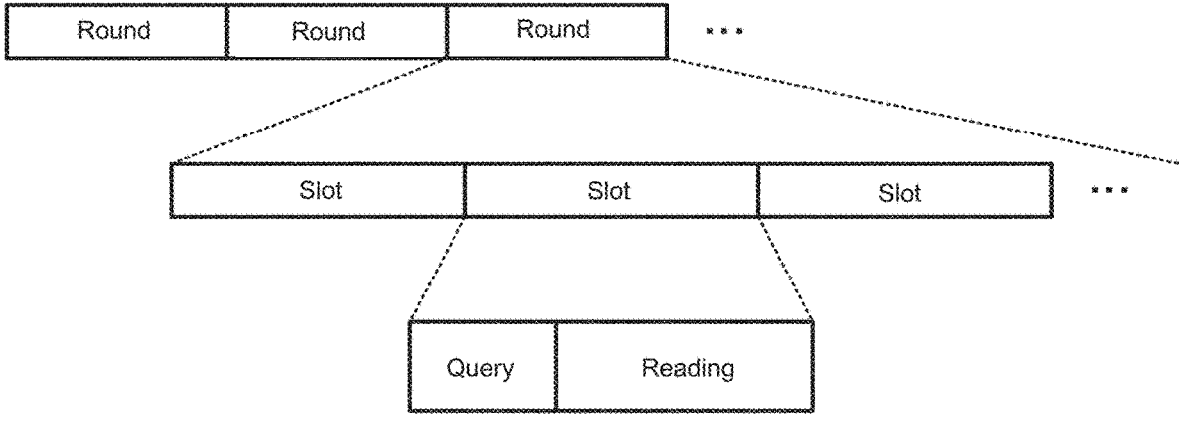
FIG. 2 is a schematic diagram showing an overview of a read operation of a wireless tag in the first embodiment.

There are various types of RFID, but the system called Class-1 Generation-2 (commonly known as Gen2) developed by EPCglobal is currently the mainstream. FIG. 2 is a schematic diagram showing an overview of a read operation of the wireless tag TG in the Gen2 system. Reading of the wireless tag TG is typically performed a plurality of times. For each reading, following initialization of the wireless tag communication apparatus 1 that is an RFID reader and the wireless tag TG, processing called a round is repeated. In the round, following initialization of the round, processing called a slot is repeated. Each slot is divided into a query to the wireless tag TG and reading. The number of slots in the round is determined in accordance with a Q-value set by the wireless tag communication apparatus 1 at the time of initialization of the round. Specifically, the number of slots is $2^Q$. The wireless tag TG randomly determines in which slot it will respond. In the case where the plurality of wireless tags TG is present in the communication area of the wireless tag communication apparatus 1, the randomly determined slot to respond can match between two or more wireless tags TG. In such a case, reading cannot be executed. In this case, reading of the wireless tags TG is executed in the next round.

Reading of the wireless tag TG in each slot will be described in more detail. In the Gen2 system, the wireless tag TG has two flag states (an A value and a B value) referred to as inventoried flags, which can be rewritten by the wireless tag communication apparatus 1. In the flag states, for example, the A value can be used as the state indicating unread and the B value can be used as the state indicating read. The wireless tag communication apparatus 1 designates the flag state of this flag when reading the wireless tag TG. In the case where the flag state of the wireless tag TG is different from the designated flag state, the wireless tag TG does not return a response. For example, in the reading designating the A value as the flag state, the wireless tag TG whose flag state is the A value responds but the wireless tag TG whose flag state is the B value does not respond. The flag state of the responded wireless tag TG is written from the A value to the B value by the wireless tag communication apparatus 1. For this reason, the responded wireless tag TG does not respond in the next and subsequent rounds for the reading designating the A value as the flag state. When a certain period of time has passed after no longer receiving radio waves, the wireless tag TG whose flag state has been rewritten to the B value changes the flag state from the B value to the A value.

Figure 3:
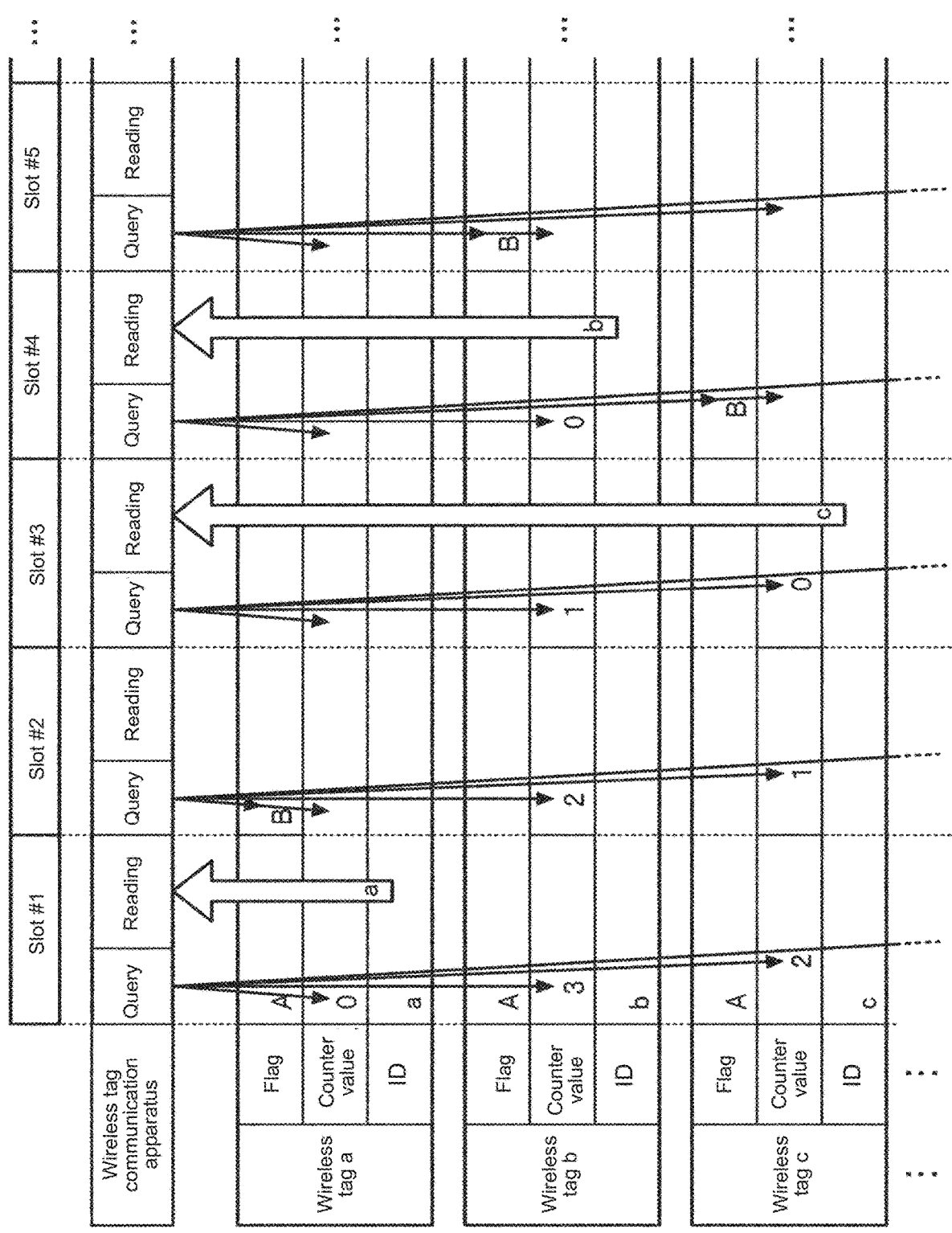
FIG. 3 is a schematic diagram showing an overview of an operation in slots in the read operation of a wireless tag.

FIG. 3 is a schematic diagram showing an overview of an operation in slots in the read operation of the wireless tag TG. Each wireless tag TG sets, as a counter value of an internal counter, the value determined randomly on the basis of the Q-value at the time of initialization of the round. For example, when Q=3, the number of slots is $2^3=8$ and the counter value is one of eight values of 0 to 7. In the example shown in FIG. 3, the wireless tag TG whose identification information is "a", i.e., tag ID=a, has the counter value of "0", the wireless tag TG whose tag ID=b has the counter value is "3", the wireless tag TG whose tag ID=c has the counter value of "2", and . . . In FIG. 3, of the wireless tags TG entering the communication area of the wireless tag communication apparatus 1, three wireless tags TG are shown. In the communication area, fewer wireless tags TG than this are present or no wireless tag TG is present in some cases. Further, in the communication area, the wireless tags TG whose counter values overlap with each other are present in some cases.

Each wireless tag TG whose flag state is the A value indicating unread at the time of initialization of reading transmits, in response to a query by a read command designating the A value as the flag state from the wireless tag communication apparatus 1, identification information of the wireless tag TG to the wireless tag communication apparatus 1 if the counter value is "0". In more detail, the wireless tag TG whose counter value is "0" transmits a 16-bit random number or pseudorandom number as a response signal to the wireless tag communication apparatus 1. The wireless tag communication apparatus 1 that has received some response signal transmits an acknowledgement (ACK) with the (pseudo) random number of the received response signal. The wireless tag TG transmits identification information to the wireless tag communication apparatus 1 upon receiving the ACK with the (pseudo) random number transmitted as a response signal. The wireless tag communication apparatus 1 reads this identification information. Note that the transmission by the wireless tag TG means carrying necessary information on a carrier wave of a signal transmitted from the wireless tag communication apparatus 1 and reflecting it, e.g., back scattering it.

In the example shown in FIG. 3, in a slot #1 that is the first slot in the round, the wireless tag TG whose counter value is "0", of the three wireless tags TG whose tag IDs are "a", "b", and "c", in response to the query from the wireless tag communication apparatus 1, is the wireless tag TG whose tag ID=a. For this reason, the wireless tag TG whose tag ID=a transmits "a" that is identification information to the wireless tag communication apparatus 1. The wireless tags TG whose tag ID=b and tag ID=c do not have the counter value of "0", and thus, do not return a response to the query.

In a slot #2 that is the next slot, the wireless tag TG whose counter value is "0" and tag ID=a rewrites the flag state from the A value to the B value indicating read, in response to the query from the wireless tag communication apparatus 1. That is, the query from the wireless tag communication apparatus 1 includes a flag rewriting instruction designating the read wireless tag TG. When the flag state is rewritten to the B value, the wireless tag TG whose tag ID=a does not update the counter value of "0" and does not transmit identification information. That is, the wireless tag TG whose tag ID=a does not respond to a query from the wireless tag communication apparatus 1. The wireless tags TG whose tag ID=b and tag ID=c and whose counter values are other than "0" decreases their counter values by "1" in response to the query. In this case, the counter values of the wireless tags TG whose tag ID=b and tag ID=c are respectively "2" and "1", and are not "0". For this reason, the wireless tags TG whose tag ID=b and tag ID=c do not return a response to a query.

In a slot #3 that is the next slot, the wireless tag TG whose flag state is the B value and whose tag ID=a does not respond to a query from the wireless tag communication apparatus 1. Meanwhile, the wireless tags TG whose tag ID=b and tag ID=c and whose counter values are other than "0" decreases their counter values by "1". In this case, the counter values of the wireless tags TG whose tag ID=b and tag ID=c are respectively "1" and "0". For this reason, the wireless tag TG whose tag ID=c and whose counter value is "0" transmits "c" that is identification information to the wireless tag communication apparatus 1. The wireless tag TG whose tag ID=b does not have the counter value of "0", and thus, does not return a response to a query.

In a slot #4 that is the next slot, the wireless tag TG whose tag ID=c and whose counter value is "0" rewrites the flag state from the A value to the B value indicating read in response to the query from the wireless tag communication apparatus 1. Further, the wireless tag TG whose tag ID=b and whose counter value is other than "0" decreases its counter value by "1". As a result, the wireless tag TG whose tag ID=b has the counter value of "0", and the wireless tag TG whose tag ID=c transmits "b" that is identification information to the wireless tag communication apparatus 1.

In a slot #5 that is the next slot, the wireless tag TG whose tag ID=b and whose counter value is "0" rewrites the flag state from the A value to the B value indicating read in response to the query from the wireless tag communication apparatus 1.

Assuming that the counter value of the wireless tag TG whose tag ID=n (not shown in FIG. 3) overlaps with the counter value of another wireless tag TG, e.g., the wireless tag TG whose tag ID=c, their counter values are "0". In this case, the respective wireless tags TG transmit response signals with different (pseudo) random numbers. When a plurality of response signals is received in this way, the wireless tag communication apparatus 1 does not transmit an ACK. For this reason, the wireless tags TG whose tag ID=c and tag ID=n do not transmit identification information. By the query in the next slot, the counter values of these wireless tags TG are decreased by "1" and become the maximum value of the counter from "0". For this reason, since the counter value is not "0", these wireless tags TG do not transmit identification information. The plurality of wireless tags TG whose counter values collide with each other has a different counter value with a high probability when the counter value is randomly determined at the start of the next round, and thus, they can be read in one subsequent slot.

Figure 4:
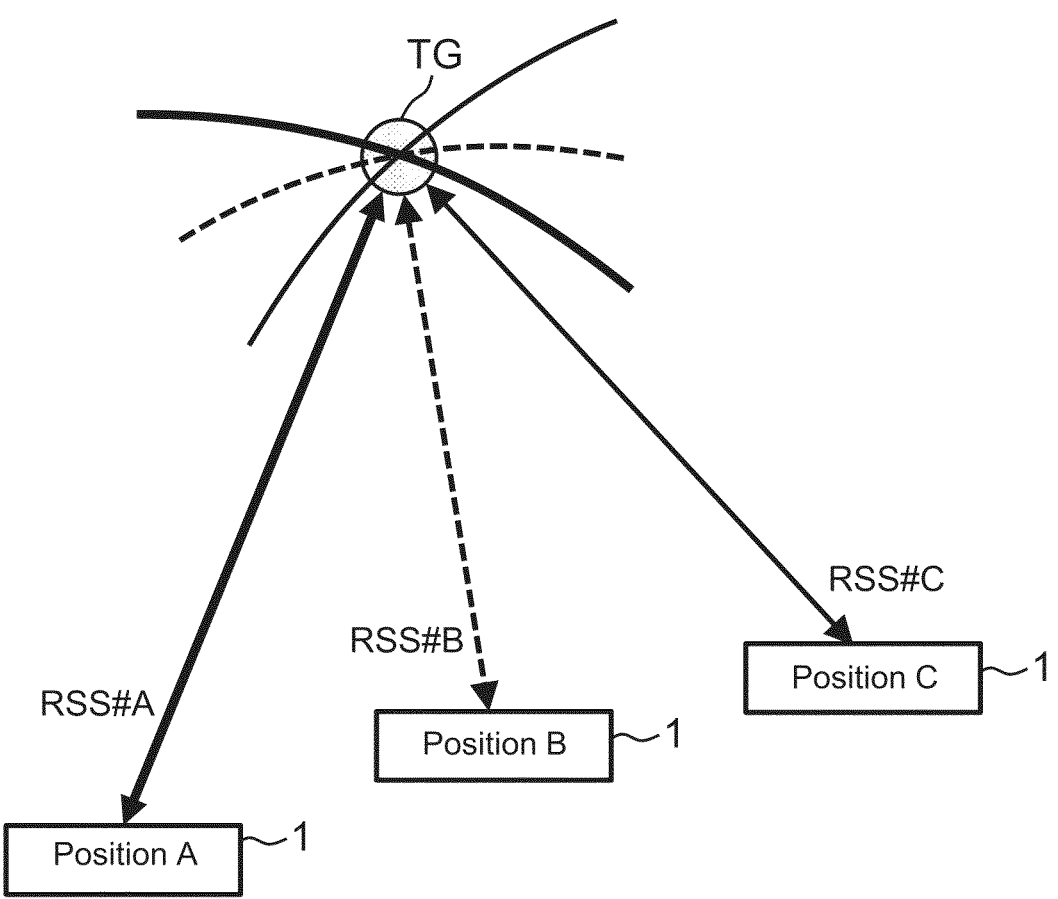
FIG. 4 is a schematic diagram describing a method of detecting a position by three-point survey.

FIG. 4 is a schematic diagram describing a method of detecting a position by three-point survey. the wireless tag communication apparatus 1 stores, upon reading the wireless tag TG, apparatus information at that time (position and orientation of an antenna) and a received signal strength indicator (RSSI) that is the strength of a response signal from the wireless tag TG detected by the wireless tag communication apparatus 1. The wireless tag communication apparatus 1 calculates the position of the wireless tag TG by three-point survey from the stored results of three or more positions, e.g., position information A, B, and C and the received signal strength indicators RSSI #A, RSSI #B, and RSSI #C.

Figure 5:
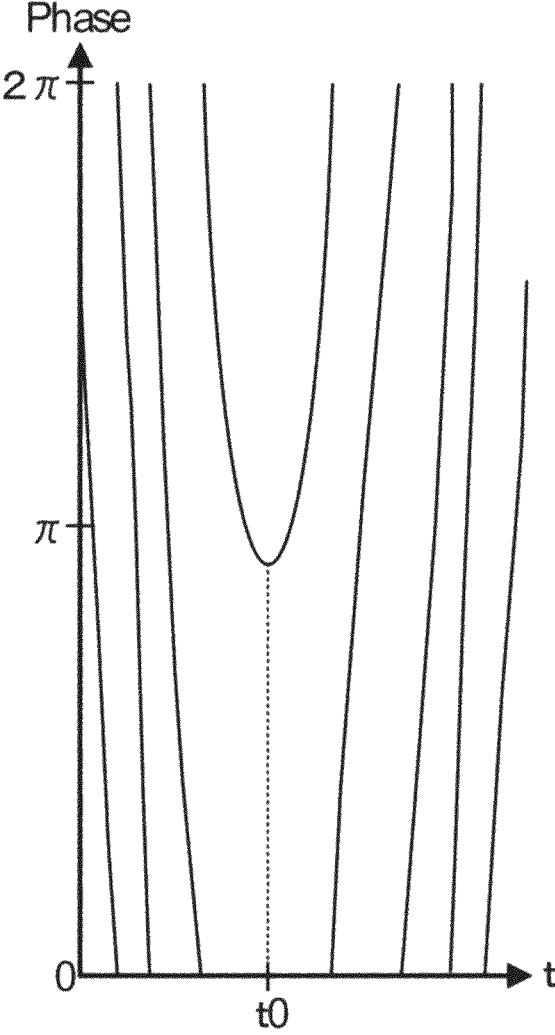
FIG. 5 is a schematic diagram describing a method of detecting a position based on a phase change.

FIG. 5 is a schematic diagram describing a method of detecting a position based on a phase change. This method of detecting a position is a method of disclosed in Japanese Patent Application Laid-open No. 2017-75927. The wireless tag communication apparatus 1 detects, upon reading the wireless tag TG, the phase of a response signal for each apparatus position (position and orientation of an antenna), and stores the position and the phase. The wireless tag communication apparatus 1 uses the position when the slope of the change in the stored phase is reversed (time to) as the position where the distance to the wireless tag TG is the shortest (first position) and calculates the position of the wireless tag TG from the first position and the phase and distance detection parameter of a second position different from the first position.

In any method of detecting a position, a plurality of apparatus positions may be realized by scanning the orientation of the wireless tag communication apparatus 1 while staying in one place, or a plurality of apparatus positions may be realized by directing the wireless tag communication apparatus 1 to one direction at one place to perform reading and causing the wireless tag communication apparatus 1 to move to another place to perform reading similarly. In the latter case, the reading can be performed in a continuous manner while causing the wireless tag communication apparatus 1 to move to move.

In any case, in order to detect the position of the wireless tag TG, it is necessary to perform a read operation on each wireless tag TG a plurality of times. For this reason, if the wireless tag TG that has been read once is not read in subsequent rounds as described with reference to FIG. 3, a plurality of RSSIs or phases, which is necessary for position detection performed in accordance with reading is not acquired, either, and the position detection cannot be performed. In this regard, when detecting the position of the wireless tag TG, the wireless tag communication apparatus 1 allows the wireless tag TG to be read again also in the next round by maintaining the flag state as the A value without rewriting it to the B value even if the wireless tag TG has been read.

However, in this case, the wireless tag TG whose position has been detected is subsequently read although reading unnecessary, and the read operation of the wireless tag TG whose position has been detected reduces the chances of reading the wireless tag TG whose position has not been detected.

Further, in an environment in which both the wireless tag TG whose position is to be detected and another wireless tag TG whose position is not to be detected are present, reading the wireless tag TG whose position is not to be detected reduces the chances of reading the wireless tag TG whose position is to be detected and whose position has not been detected. This becomes a big problem particularly in a usage situation where an item to which a specific wireless tag TG from a plurality of wireless tags TG has been attached is searched for.

The wireless tag communication system and the wireless tag communication apparatus 1 according to this embodiment address such an issue.

FIG. 1 will be described again. The wireless tag communication apparatus 1 includes a processor 10, a memory 20, an input device 30, an output device 40, a sensor 50, a wireless communication device 60, a communication interface 70, and a system transmission path 80. Note that in FIG.

1, the "interface" is abbreviated as "I/F". The system transmission path 80 includes an address bus, a data bus, a control signal line, and the like. The system transmission path 80 connects the processor 10 and the other units to each other directly or via a signal input/output circuit and transmits data signals transmitted/received therebetween. The processor 10 and the memory 20 are connected to each other via the system transmission path 80, thereby configuring a computer of the wireless tag communication apparatus 1. The memory 20 includes a detection target storage unit 21, a position-correction-valid-flag storage unit 22, a read data storage unit 23, and a position-calculation-result storage unit 24. The wireless communication device 60 includes an antenna 61, a wireless tag communication circuit 62, an RSSI detector 63, and a phase detector 64.

The processor 10 corresponds to the central part of the above computer. The processor 10 controls the respective units in accordance with an operating system or control program to realize various functions as the wireless tag communication apparatus 1. The processor 10 is, for example, a central processing unit (CPU). The processor 10 may be, for example, a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 10 may be a combination of two or more of these.

The memory 20 corresponds to the main memory part of the above computer. The memory 20 has a non-volatile memory area and a volatile memory area. The memory 20 stores an operating system or control program in the non-volatile memory area. Further, the memory 20 stores data necessary for the processor 10 to execute processing for controlling the respective units in the non-volatile or volatile memory area. The memory 20 includes, for example, the detection target storage unit 21 and the position-correction-valid-flag storage unit 22 as such a memory area. Further, the memory 20 uses the volatile memory area as a work area in which data is appropriately rewritten by the processor 10. The memory 20 includes, for example, the read data storage unit 23 and the position-calculation-result storage unit 24 as such a memory area. Note that the non-volatile memory area is, for example, a rewritable storage device such as a read only memory (ROM) and an electric erasable programmable read-only memory (EEPROM). Further, the volatile memory area is, for example, a random access memory (RAM).

The detection target storage unit 21 stores data such as which is the wireless tag TG whose position is to be detected and whether or not the position of the wireless tag TG has been detected. FIG. 6 is a schematic diagram showing a main data structure stored in this detection target storage unit 21. Note that the data structure shown in FIG. 6 is merely an example. As long as information necessary for the processor 10 can be acquired, the format thereof is not particularly limited. As shown in FIG. 6, the detection target storage unit 21 stores, for example, identification information of the wireless tag TG whose position is to be detected set from the primary apparatus UE. Further, the detection target storage unit 21 stores detected information indicating whether or not it has been detected, in association with identification information of the wireless tag TG whose position is to be detected. In the case where the detected information is marked with a cross, it means that it has not been detected. In the case where the detected information is marked with a circle, it means that it has been detected. The detection target storage unit 21 is capable of storing this detected information as, for example, a 1-bit flag with the cross mark as "0" and the circle mark as "1". For this reason, the detection target storage unit 21 is an example of a detection target storage unit that stores detected information in association with identification information of each of one or more wireless tags TG whose positions are to be detected, the detected information indicating whether or not the position of the wireless tag TG has been detected.

The position-correction-valid-flag storage unit 22 stores a position-correction-valid flag indicating whether or not the detected position of the wireless tag TG needs to be corrected. The position-correction-valid-flag storage unit 22 is capable of storing, for example, this position-correction-valid flag as a 1-bit flag with correction unnecessary as "0" and correction necessary as "1". As described above, the position-correction-valid-flag storage unit 22 is an example of a setting storage unit that stores a position-correction-valid flag indicating a setting regarding whether or not a position of the wireless tag TG whose position has been detected is to be corrected.

The read data storage unit 23 stores data read from the wireless tag TG whose position is to be detected. FIG. 7 is a schematic diagram showing a main data structure stored in this read data storage unit 23. Note that the data structure shown in FIG. 7 is merely an example. As long as information necessary for the processor 10 can be acquired, the format thereof is not particularly limited. As shown in FIG. 7, the read data storage unit 23 stores position detection data in association with the identification information read from the wireless tag TG whose position is to be detected. The position detection data includes, for example, an acquisition time, an RSSI, a phase, and an apparatus position.

The acquisition time is the time at which identification information was acquired from the wireless tag TG whose position is to be detected. As described above, the identification information is read in a different a slot. For this reason, the acquisition time can also be referred to as the slot occurrence time. More specifically, it can also be referred to as the read time of identification information in a slot. The wireless tag communication apparatus 1 includes a clock (not shown in FIG. 1), and the processor 10 is capable of acquiring the acquisition time of identification information using this clock and storing, in the read data storage unit 23, the identification information acquired by the wireless communication device 60 and this acquisition time. Further, the acquisition time may be the current time or the elapsed time since reading started.

The RSSI indicates the signal strength of a response signal carrying identification information from the wireless tag TG whose position is to be detected. This RSSI is detected by the RSSI detector 63 (signal strength detector) of the wireless communication device 60. Further, the phase is a phase of a response signal similarly and is detected by the phase detector 64 of the wireless communication device 60. The RSSI and the phase are examples of a communication state with the wireless tag TG acquired by the wireless communication device 60. The processor 10 is capable of storing, in the read data storage unit 23, the RSSI and the phase at the time of acquiring identification information, in association with the identification information. Note that although an example in which both the RSSI and the phase are used to detect a position is shown in FIG. 1 and FIG. 7, at least one of the RSSI or the phase may be detected and stored, because the position can be detected with only one of them. The RSSI detector 63 or the phase detector 64 as a state detector is an example of a state detection device that detects a communication state with the wireless tag TG by the wireless communication device 60.

The apparatus position is position information indicating the position of the wireless tag communication apparatus 1 at the time of acquiring a response signal from the wireless tag TG whose position is to be detected. The position information can include information regarding the position and orientation of the antenna 61 included in the wireless communication device 60. The processor 10 calculates the position and orientation of the antenna 61 on the basis of the detection result of the sensor 50. Actually, the position-posture relationship between the antenna 61 and the wireless tag TG changes depending on the performance of the antenna 61 such as directivity. However, the processor 10 calculates the position and orientation assuming that the wireless tag TG is present in the front direction of the antenna 61. The processor 10 stores the calculated apparatus position in the read data storage unit 23 in association with the identification information. Note that the calculation of the position and orientation of the antenna 61 by the processor 10 based on the detection result of the sensor 50 takes some time. For this reason, while the acquisition time is in units of slots, this apparatus position is in units of rounds. That is, one or more pieces of identification information acquired in a plurality of slots in one round are the same apparatus position.

The position-calculation-result storage unit 24 stores the position detection result obtained by detecting the wireless tag TG whose position is to be detected.

The input device 30 is an operation switch, an operation button, or the like disposed in a casing (not shown) of the wireless tag communication apparatus 1. Alternatively, the input device 30 may be an interface for connecting to an operation switch, an operation button, or the like separate from the casing of the wireless tag communication apparatus 1. The output device 40 is a display device such as a liquid crystal display and an LED, a sound device such as a buzzer and a speaker, or the like, which is disposed in the casing of the wireless tag communication apparatus 1. Alternatively, the output device 40 may be an interface for connecting to a display device, a sound device, or the like separate from the casing of the wireless tag communication apparatus 1. Further, the input device 30 and the output device 40 may be configured as a touch panel in which touch keys are disposed on a display screen such as a liquid crystal display.

The processor 10 is capable of causing a user to set the wireless tag TG whose position is to be detected and set a position-correction-valid flag using the input device 30 and the output device 40. Further, the processor 10 is capable of notifying a user of the position of the detected wireless tag TG whose position is to be detected and the end of the position detection operation using the output device 40.

The sensor 50 is various sensors used for calculating the above apparatus position to be stored in the read data storage unit 23. For example, as such a sensor 50, an acceleration sensor, a camera, or the like can be included. For example, the processor 10 is capable of calculating the amount of movement of the wireless tag communication apparatus 1 on the basis of the acceleration detected by the acceleration sensor and determining the position on the basis of this amount of movement. For example, the processor 10 is capable of estimating the self-position on the basis of the amount of movement of a subject in an image taken by the camera. Further, the sensor 50 may include a positioning sensor such as a global positioning system (GPS) sensor.

The wireless communication device 60 has a communication area CA with a certain range as shown by a broken line in FIG. 1 and wirelessly communicates with the wireless tag TG that has entered this communication area CA, which is, for example, a UHF band RFID tag. The wireless communication device 60 is an example of a wireless communication device that communicates with the wireless tag TG that includes a flag for storing a flag state of one of the first state such as the A value and the second state such as the B value and returns, upon receiving a read command designating a flag state, identification information only in the case where the flag state corresponds to the designated flag state. The wireless tag TG includes the wireless tag TG whose position is to be detected and the non-detection target wireless tag TG whose position is not to be detected. The wireless communication device 60 includes the antenna 61 and the wireless tag communication circuit 62 for wirelessly communicating with the wireless tag TG that has entered the communication area CA. Further, the wireless communication device 60 includes the RSSI detector 63 that detects an RSSI that is the strength of a response signal from the wireless tag TG and the phase detector 64 that detects the phase of a response signal from the wireless tag TG.

The communication interface 70 performs data communication between the communication interface 70 and the primary apparatus UE connected thereto in accordance with a communication protocol set in advance. The connection with the primary apparatus UE may be wired connection or wireless connection.

The primary apparatus UE is an information processing apparatus such as a server computer and an information processing device such as a smartphone. The primary apparatus UE is capable of realizing various functions such as a function of receiving, from the wireless tag communication apparatus 1, the detected position of the wireless tag TG to be detected and storing the received position, a function of using and presenting the stored position, a function of supplying the stored position to another apparatus, and a function of generating new information combining the stored positions. Further, the primary apparatus UE may have a function of controlling the wireless tag communication apparatus 1, such as a function of giving various settings such as a setting of the wireless tag TG whose position is to be detected in the wireless tag communication apparatus 1 and a setting of a position-correction-valid flag to the processor 10 and a function of instructing the operation start of the wireless tag communication apparatus 1.

Operations of the wireless tag communication system and the wireless tag communication apparatus 1 having such configurations according to this embodiment will be described below. Note that since the operation of setting the wireless tag TG whose position is to be detected and the position-correction-valid flag is an operation of simply setting in accordance with user's designation, description thereof is omitted. For this reason, the operation relating to position detection of the wireless tag TG to be detected will be described.

Figure 8:
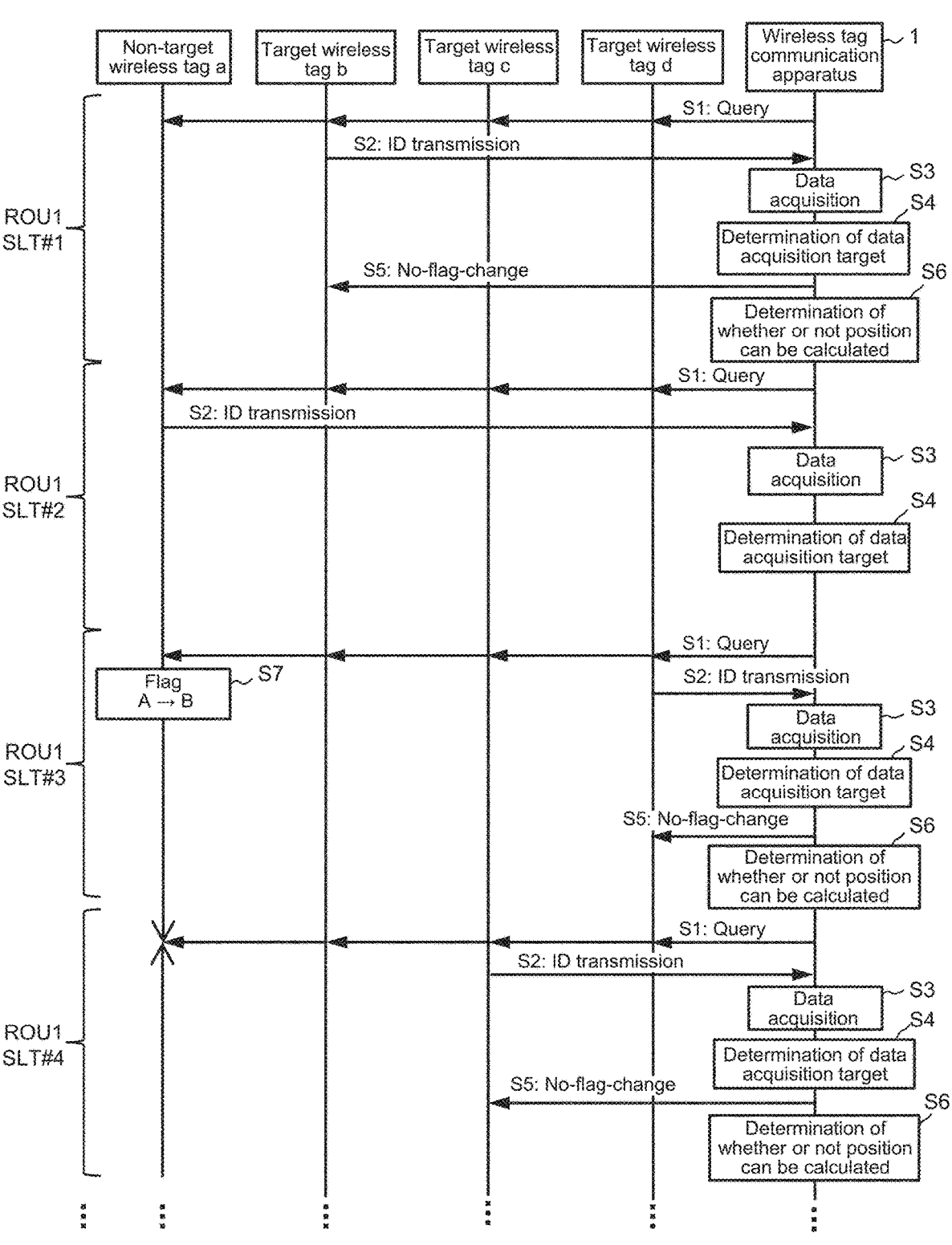
FIG. 8 is a sequence diagram showing an overview of an operation of the wireless tag communication apparatus.
Figure 9:
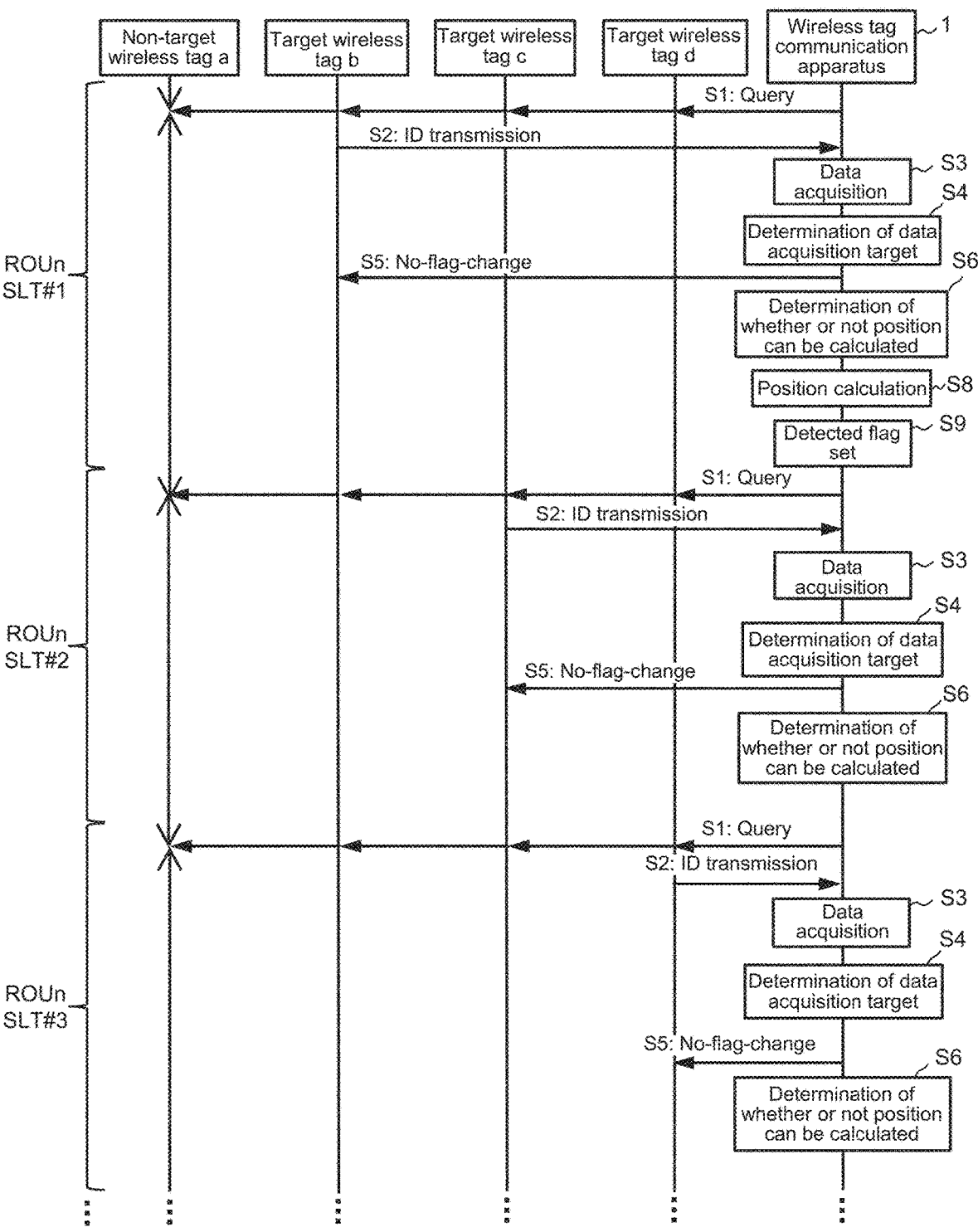
FIG. 9 is a sequence diagram showing an overview of an operation of the wireless tag communication apparatus.
Figure 10:
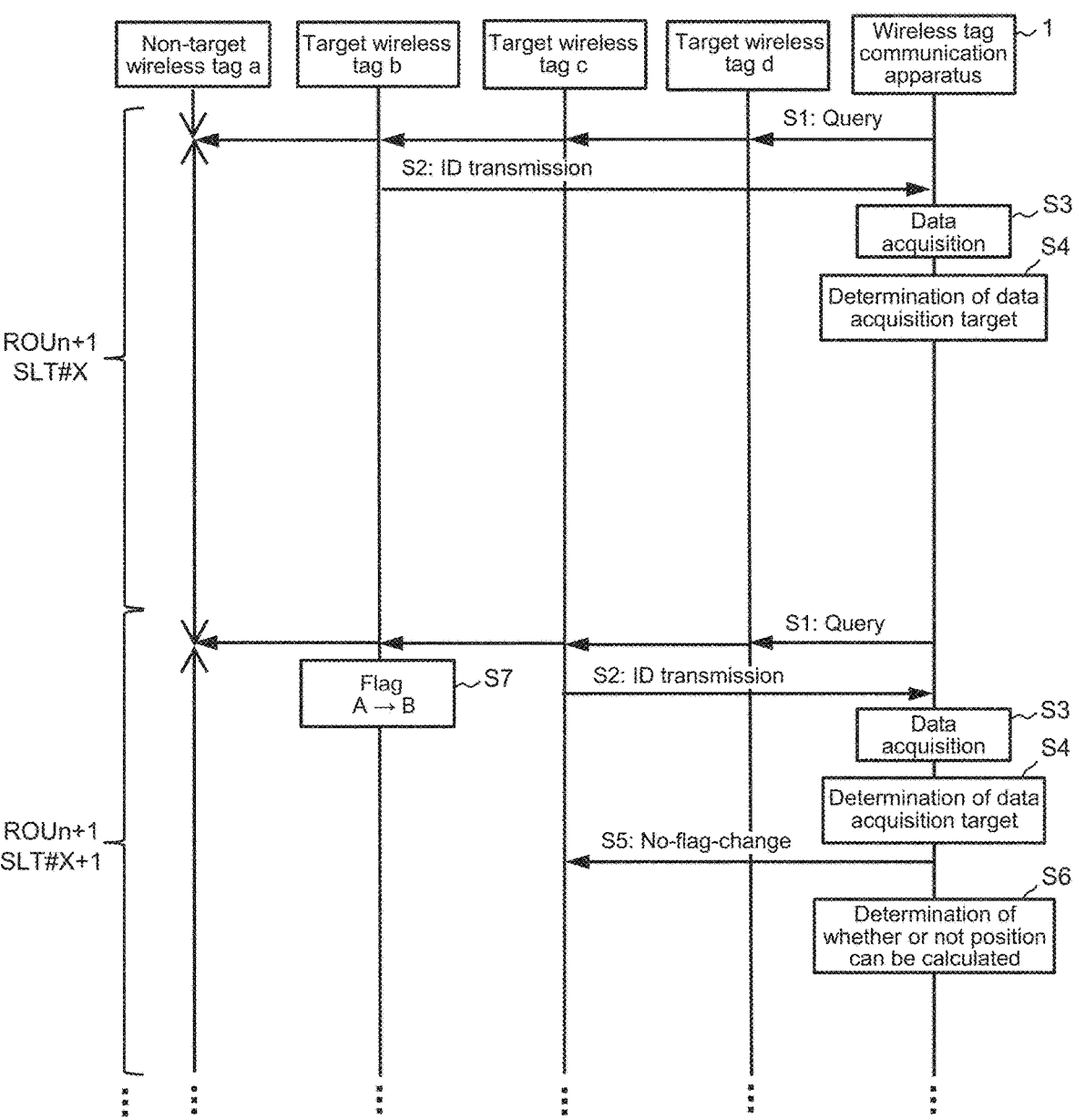
FIG. 10 is a sequence diagram showing an overview of an operation of the wireless tag communication apparatus.

FIG. 8 to FIG. 10 are each a sequence diagram showing an overview of an operation of the wireless tag communication apparatus 1. FIG. 8 shows the round 1 (ROU1) of reading, FIG. 9 shows the round n (ROUn) of reading, and FIG. 10 shows the round n+1 (ROUn+1) of reading. FIG. 8 to FIG. 10 each show an example in which four wireless tags TG, i.e., a non-target wireless tag a whose identification information (tag ID) is "a", a target wireless tag b whose identification information is "b", a target wireless tag c whose identification information is "c", and a target wireless tag d whose identification information is "d", are in the communication area CA. Note that FIG. 8 to FIG. 10 each show an ideal case where the counter values do not collide with each other. Actually, the wireless tag communication apparatus 1 does not receive identification information (tag ID) in some cases due to the collision of the counter values of the plurality of wireless tags TG.

As shown in FIG. 8, the wireless tag communication apparatus 1 transmits a query to the wireless tag TG entering the communication area CA in the slot 1 (SLT #1) of the round 1 (ROU1) (Step S1).

In response to the query transmitted from the wireless tag communication apparatus 1, for example, the target wireless tag b, of the four wireless tags TG in the communication area CA, transmits identification information (tag ID) to the wireless tag communication apparatus 1 (Step S2).

The wireless tag communication apparatus 1 receives the identification information transmitted from the target wireless tag b. The wireless tag communication apparatus 1 acquires, upon receiving the identification information, position detection data, i.e., an acquisition time, an RSSI, and a phase (Step S3). The wireless tag communication apparatus 1 stores the acquired position detection data in the read data storage unit 23 in association with the received identification information. Note that the apparatus position in the position detection data is stored in the read data storage unit 23 once the calculation is completed.

The wireless tag communication apparatus 1 determines, on the basis of the content stored in the detection target storage unit 21, whether or not the received identification information is an acquisition target of position detection data (Step S4). Specifically, in the case where the received identification information is the wireless tag TG stored in the detection target storage unit 21, i.e., the wireless tag TG whose position is to be detected, and the detection flag associated with the corresponding identification information is undetected, the wireless tag communication apparatus 1 determines that the received identification information is a data acquisition target.

In the case where the received identification information is a data acquisition target, the wireless tag communication apparatus 1 instructs the wireless tag b on a no-flag-change (Step S5). Note that the wireless tag TG transmits identification information in response to a query from the wireless tag communication apparatus 1 and then rewrites the flag state at the time of receiving a query command in the next slot. In this regard, the wireless tag communication apparatus 1 instructs the wireless tag b that is a data acquisition target not to change the flag state.

The wireless tag communication apparatus 1 determines whether or not the position of the target wireless tag b having the received identification information can be calculated from the data stored in the read data storage unit 23 (Step S6). In the case where the position cannot be calculated, the wireless tag communication apparatus 1 ends the processing of this slot.

In the next slot 2 (SLT #2), the wireless tag communication apparatus 1 transmits a query to the wireless tag TG entering in the communication area CA (Step S1).

In response to the query transmitted from the wireless tag communication apparatus 1, for example, the non-target wireless tag a, of the four wireless tags TG in the communication area CA, transmits identification information (tag ID) to the wireless tag communication apparatus 1 (Step S2).

The wireless tag communication apparatus 1 acquires, upon receiving the identification information transmitted from the non-target wireless tag a, position detection data, i.e., an acquisition time, an RSSI, and a phase at the time of the reception of the identification information (Step S3). The wireless tag communication apparatus 1 determines, on the basis of the content stored in the detection target storage unit 21, whether or not the identification information is an acquisition target of position detection data (Step S4). The wireless tag communication apparatus 1 determines that the non-target wireless tag a of the received identification information is not a data acquisition target. For this reason, in this case, the wireless tag communication apparatus 1 does not instruct the non-target wireless tag a that is not a data acquisition target on a no-flag-change.

In the case where it is determined that the received identification information is not a data acquisition target, the wireless tag communication apparatus 1 ends the processing of this slot.

In the next slot 3 (SLT #3), the wireless tag communication apparatus 1 transmits a query to the wireless tag TG entering in the communication area CA (Step S1).

The non-target wireless tag a that has not received a no-flag-change instruction rewrites the flag state from the A value to the B value in response to this query (Step S7). In this way, the wireless tag communication apparatus 1 is capable of rewriting the flag state of the non-target wireless tag a from the A value to the B value by not transmitting, to the non-target wireless tag a whose position is not to be detected, a no-flag-change instruction for instructing not to rewrite the flag state to the B value.

Further, of the remaining two target wireless tags TG excluding the target wireless tag b that has transmitted identification information, for example, the target wireless tag d transmits identification information (tag ID) to the wireless tag communication apparatus 1 in response to the query (Step S2).

The wireless tag communication apparatus 1 acquires position detection data by receiving the identification information from the target wireless tag d (Step S3), and determines whether or not it is an acquisition target of position detection data (Step S4). In the case where it is a data acquisition target, the wireless tag communication apparatus 1 transmits a no-flag-change instruction (Step S5). The wireless tag communication apparatus 1 determines whether or not the position of the target wireless tag d can be calculated (Step S6), and ends the processing of this slot in the case where the position cannot be calculated.

In the next slot 4 (SLT #4), the wireless tag communication apparatus 1 transmits a query to the wireless tag TG entering the communication area CA (Step S1). In this case, the non-target wireless tag a whose flag state has been rewritten from the A value to the B value does not respond to this query. That is, the non-target wireless tag a ignores this query.

Further, for example, when the target wireless tag c transmits identification information (tag ID) to the wireless tag communication apparatus 1 in response to the query (Step S2), the wireless tag communication apparatus 1 acquires position detection data (Step S3), and determines, on the basis of the identification information, whether or not it is an acquisition target of position detection data (Step S4). In the case where it is a data acquisition target, the wireless tag communication apparatus 1 transmits a no-flag-change instruction (Step S5). The wireless tag communication apparatus 1 determines whether or not the position of the target wireless tag c can be calculated (Step S6), and ends the processing of this slot in the case where the position cannot be calculated.

After that, similarly, each wireless tag TG and the wireless tag communication apparatus 1 perform processing of the remaining slots of the round 1 (ROU1) and subsequent rounds.

As shown in FIG. 9, the wireless tag communication apparatus 1 transmits a query to the wireless tag TG entering the communication area CA in the slot 1 (SLT #1) of the round n (ROUn) (Step S1). The non-target wireless tag a whose flag state is the B value does not respond to this query.

When, for example, the target wireless tag b transmits identification information (tag ID) to the wireless tag communication apparatus 1 in response to the query transmitted from the wireless tag communication apparatus 1 (Step S2), the wireless tag communication apparatus 1 acquires position detection data (Step S3). Further, the wireless tag communication apparatus 1 determines, on the basis of the received identification information, whether or not it is an acquisition target of position detection data (Step S4), and transmits a no-flag-change instruction in the case where it is a data acquisition target (Step S5). The wireless tag communication apparatus 1 determines whether or not the position of the target wireless tag b can be calculated (Step S6).

In the case where the position can be calculated, the wireless tag communication apparatus 1 calculates the position of the target wireless tag b on the basis of the position detection data stored in the read data storage unit 23 (Step S8). The wireless tag communication apparatus 1 stores the calculated position of the target wireless tag b in the position-calculation-result storage unit 24.

Further, the wireless tag communication apparatus 1 sets the detection flag associated with the identification information of the target wireless tag b that is the corresponding wireless tag TG in the detection target storage unit 21 as detected (Step S9). The wireless tag communication apparatus 1 ends the processing of this slot.

When the wireless tag communication apparatus 1 transmits a query in the next slot 2 (SLT #2) (Step S1), the non-target wireless tag a whose flag state is the B value does not respond to this query.

Further, when, for example, the target wireless tag c transmits identification information (tag ID) to the wireless tag communication apparatus 1 in response to the query (Step S2), the wireless tag communication apparatus 1 acquires position detection data (Step S3). Further, the wireless tag communication apparatus 1 determines, on the basis of the received identification information, whether or not it is an acquisition target of position detection data (Step S4), and transmits a no-flag-change instruction in the case where it is a data acquisition target (Step S5). The wireless tag communication apparatus 1 determines whether or not the position of the target wireless tag c can be calculated (Step S6), and ends the processing of this slot in the case where the position cannot be calculated.

In the next slot 3 (SLT #3), when the wireless tag communication apparatus 1 transmits a query (Step S1), the non-target wireless tag a whose flag state is the B value does not respond to this query.

Further, when, for example, the target wireless tag d transmits identification information (tag ID) to the wireless tag communication apparatus 1 in response to the query (Step S2), the wireless tag communication apparatus 1 acquires position detection data (Step S3). Further, the wireless tag communication apparatus determines, on the basis of the received identification information, whether or not it is an acquisition target of position detection data (Step S4), and transmits a no-flag-change instruction in the case where it is a data acquisition target (Step S5). The wireless tag communication apparatus 1 determines whether or not the position of the target wireless tag d can be calculated (Step S6), and ends the processing of this slot in the case where the position cannot be calculated.

After that, similarly, each wireless tag TG and the wireless tag communication apparatus 1 perform processing of the remaining slots of the round n (ROUn) and subsequent rounds until all positions of the wireless tags TG of the identification information stored in the detection target storage unit 21 are calculated.

As shown in FIG. 10, the wireless tag communication apparatus 1 transmits a query to the wireless tag TG entering the communication area CA in the slot X (SLT #X) (X is a natural number.) of the round n+1 (ROUn+1) (Step S1). The non-target wireless tag a whose flag state is the B value does not respond to this query.

When, for example, the target wireless tag b transmits identification information (tag ID) to the wireless tag communication apparatus 1 in response to the query transmitted from the wireless tag communication apparatus 1 (Step S2), the wireless tag communication apparatus 1 acquires position detection data (Step S3). Further, the wireless tag communication apparatus 1 determines, on the basis of the received identification information, whether or not it is an acquisition target of position detection data (Step S4). In Step S9 of the slot 1 (SLT #1) of the previous round n (ROUn), the detection flag associated with the identification information of the target wireless tag b that is the corresponding wireless tag TG in the detection target storage unit 21 is set as detected. For this reason, the wireless tag communication apparatus 1 determines that it is not an acquisition target of position detection data. Therefore, in this case, the wireless tag communication apparatus 1 does not instruct the target wireless tag b that is not a data acquisition target on a no-flag-change.

In the case where it is determined that the received identification information is not a data acquisition target, the wireless tag communication apparatus 1 ends the processing of this slot.

In the next slot X+1 (SLT #X+1), the wireless tag communication apparatus 1 transmits a query to the wireless tag TG entering the communication area CA (Step S1). The target wireless tag b that has not received a no-flag-change instruction rewrites the flag state from the A value to the B value in response to this query (Step S7). Since other operations are as described above in the round n (ROUn), description thereof is omitted. In this way, the wireless tag communication apparatus 1 is capable of rewriting the flag state from the A value to the B value by not transmitting a no-flag-change to the wireless tag b whose position is not to be detected because the position has been detected.

Figure 11:
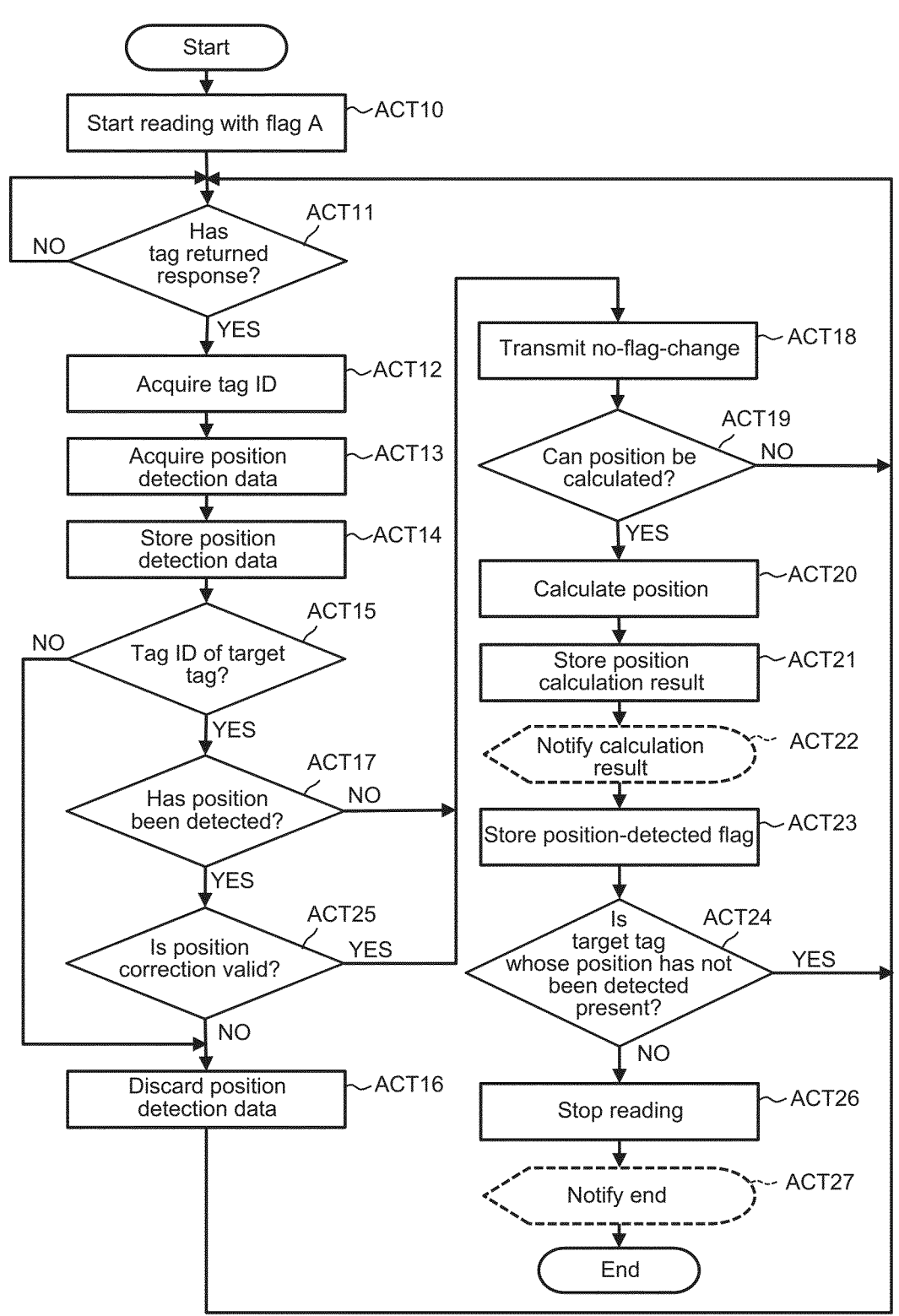
FIG. 11 is a flow diagram showing a main procedure of information processing executed by a processor of the wireless tag communication apparatus.

Next, a specific example of the operation of the wireless tag communication apparatus 1 will be described. FIG. 11 is a flow diagram showing a main procedure of information processing executed by the processor 10 of the wireless tag communication apparatus 1. The processor 10 executes, upon receiving, for example, a start operation by the input device 30 and a start instruction by the communication interface 70 from the primary apparatus UE, this processing on the basis of the control program stored in the memory 20. Note that unless otherwise specified, the processing operation of the processor 10 proceeds to ACTx (x is a natural number.) and then ACT (x+1). Further, the procedure shown in FIG. 11 is merely an example. The procedure is not particularly limited as long as similar effects can be achieved.

In ACT10, the processor 10 causes the wireless communication device 60 to operate to start reading the wireless tag TG designating the A value as the flag state.

In ACT11, the processor 10 determines whether or not any wireless tag TG has returned a response, i.e., whether or not the wireless communication device 60 has received a response. In the case of receiving a response, the processor 10 determines YES in ACT11 and the processing proceeds to ACT12. Further, in the case of receiving no response, the processor 10 determines NO in ACT11 and repeats ACT11 again. In this way, the processor 10 stands by until a response is received from any wireless tag TG.

In ACT12, the processor 10 acquires the tag ID, i.e., identification information of the wireless tag TG that has returned a response. Specifically, the processor 10 transmits, by the wireless communication device 60, ACK to the wireless tag G that has returned a response, and receives the tag ID transmitted from the corresponding wireless tag TG in accordance with this. The processor 10 stores, in the work area of the memory 20, the tag ID received by the wireless communication device 60. For this reason, the processor 10 is an example of an acquisition function unit that transmits, by the wireless communication device 60, a read command designating, for example, the A value that is the first state as the flag state, and acquires identification information returned from the wireless tag TG whose flag state is the first state.

In ACT13, the processor 10 acquires position detection data. Specifically, the processor 10 acquires time (the current time or elapsed time) and detects an RSSI and a phase by the RSSI detector 63 and the phase detector 64 of the wireless communication device 60. Further, the processor 10 calculates the position and orientation of the wireless tag communication apparatus 1, in more detail, the antenna 61, on the basis of the detection result of the sensor 50.

In ACT14, the processor 10 stores the acquired position detection data in the read data storage unit 23 in association with the rag ID stored in the work area, i.e., identification information.

In ACT15, the processor 10 determines whether or not the received tag ID is the tag ID of the wireless tag TG whose position is to be detected. Specifically, whether or not the tag ID that matches the tag ID stored in the work area, i.e., identification information is stored in the detection target storage unit 21 is checked. In the case where the matching identification information is stored, the processor 10 determines that the received tag ID is the tag ID of the wireless tag TG whose position is to be detected, i.e., YES in ACT15, and the processing proceeds to ACT17. Further, in the case where the received tag ID is not the tag ID of the wireless tag TG whose position is to be detected, the processor 10 determines NO in ACT15, and the processing proceeds to ACT16. In this way, the processor 10 determines, on the basis of whether or not the acquired identification information is stored in the detection target storage unit 21, whether or not the wireless tag TG that has returned identification information is the wireless tag whose position is to be detected.

In ACT16, the processor 10 discards position detection data stored in the read data storage unit 23. Specifically, the position detection data stored in the read data storage unit 23 in association with the identification information is deleted. After that, the processing of the processor 10 proceeds to ACT11. In this way, the processor 10 causes the wireless tag TG determined as not a wireless tag whose position is to be detected to rewrite the flag state of the wireless tag TG from the A value to the B value by not transmitting a no-flag-change instruction to the wireless tag TG, and discards the position detection data of the wireless tag TG, which is not used.

In ACT17, the processor 10 determines whether or not the position of the wireless tag TG determined as a wireless tag whose position is to be detected has been detected. Specifically, the processor 10 checks the detection flag associated with the corresponding identification information stored in the detection target storage unit 21 and determines whether or not the detection flag indicates detected. That is, the processor 10 determines, on the basis of the detected information stored in the detection target storage unit 21 in association with the acquired identification information, whether or not the wireless tag TG that has returned identification information is a wireless tag whose position has been detected and is to be detected. Therefore, the processor 10 is an example of a determination function unit that determines, on the basis of the acquired identification information, whether or not the position of the wireless tag TG that has returned identification information has been detected. In the case where the position has been detected, the processor 10 determines YES in ACT17, and the processing proceeds to ACT25. In the case where the position has been undetected, the processor 10 determines NO in ACT17, and the processing proceeds to ACT18.

In ACT18, the processor 10 transmits, by the wireless communication device 60, a no-flag-change instruction for instructing the wireless tag TG whose position is to be detected to not rewrite the flag state.

In ACT19, the processor 10 determines whether or not the position of the wireless tag TG can be detected on the basis of the position detection data stored in the read data storage unit 23. For example, in the case where the position detection is calculated by three-point survey, the processor 10 is capable of determining that the position can be calculated in the case where the number of RSSIs stored in the read data storage unit 23 in association with the identification information of the wireless tag TG is a predetermined number or more. Further, in the case where the position detection is calculated on the basis of the phase, the processor 10 is capable of determining that the position can be calculated in the case where the slope of the change in the phase stored in the read data storage unit 23 in association with the identification information of the wireless tag TG is reversed. In any case, considering the possibility of false detection of detection data due to noise or the like, it is desired to determine that the position can be calculated once a certain amount of excessive detection data has been acquired instead of immediately determining that the position can be calculated. In the case where the position can be calculated, the processor 10 determines YES in ACT19, and the processing proceeds to ACT20. In the case where the position cannot be calculated, the processor 10 determines NO in ACT19, and the processing proceeds to ACT11.

In ACT20, the processor 10 calculates the position of the wireless tag TG on the basis of the position detection data stored in the read data storage unit 23. The processor 10 is an example of a position detection function unit that detects the position of the wireless tag TG on the basis of the detected communication state.

In ACT21, the processor 10 stores the calculated position in the position-calculation-result storage unit 24 in association with the identification information of the wireless tag TG.

In ACT22, the processor 10 notifies the calculation result by the output device 40. Note that in the case where the orientation of the wireless tag communication apparatus 1 is scanned while staying in one place or reading is performed in a continuous manner while causing the wireless tag communication apparatus 1 to move, this ACT22 may be omitted.

In ACT23, the processor 10 stores a position-detected flag. Specifically, the detection flag stored in the detection target storage unit 21 in association with the identification information of the wireless tag TG whose position has been detected is set as detected. The processor 10 is an example of a storage control function unit that sets, in the case where the position of the wireless tag TG is detected, the detected information stored in the detection target storage unit 21 in association with the identification information of the wireless tag TG as position detected.

In ACT24, the processor 10 determines whether or not a target wireless tag whose position has not been detected is present. Specifically, the processor 10 determines whether or not identification information associated with a detection flag in the detection target storage unit 21 is undetected is present. In the case where a target wireless tag whose position has not been detected is present, the processor 10 determines YES in ACT24, and the processing proceeds to ACT11. Note that at this time, if one round ends, the next round is started. Further, in the case where a reading method of directing the wireless tag communication apparatus 1 to one direction at one place to perform reading and causing the wireless tag communication apparatus 1 to move to another place to perform reading similarly is performed, if this target wireless tag whose position has not been detected is present, this fact may be notified by the output device 40 to prompt a user to move to another place. Further, in the case where a target wireless tag whose position has not been detected is not present, i.e., the positions of all wireless tags TG whose positions are to be detected are detected, the processor 10 determines NO in ACT24, and the processing proceeds to ACT26.

In ACT25, the processor 10 determines whether or not the position correction is valid, by checking the position-correction-valid flag indicating whether or not the detected position of the wireless tag TG needs to be corrected, which is stored in the position-correction-valid-flag storage unit 22.

In the case where the position correction is not valid, i.e., no position correction is performed, it is unnecessary to acquire any more position detection data for the target wireless tag TG whose position has been detected. For this reason, in the case where the position correction is not valid, the processor 10 determines NO in ACT25, and the processing proceeds to ACT16. As a result, in ACT16, the processor 10 discards the position detection data stored in the read data storage unit 23, by the wireless communication device 60. In this way, the processor 10 causes the wireless tag TG whose position has been detected and determined not to be corrected to rewrite the flag state of the wireless tag TG from the A value to the B value in response to a query in the next slot by not transmitting a no-flag-change instruction to the wireless tag TG, and discards the position detection data of the wireless tag TG, which is not used. The processor 10 is an example of an instruction function unit that instructs, in the case where the position of the wireless tag that has returned identification information has been detected, the wireless tag that has returned identification information to rewrite the flag state to the second state by the wireless communication device 60.

Meanwhile, in the case where the position correction is valid, i.e., position detection with higher accuracy is performed by further using, even if the position has been detected, position detection data obtained after that, the processor 10 determines YES in ACT25, and the processing proceeds to ACT18. In this way, the processor 10 sets, in the case where the setting stored in the position-correction-valid-flag storage unit 22 is a setting for correcting the position, the wireless tag TG whose position has been detected as a wireless tag whose position is to be detected again by transmitting a no-flag-change instruction to the wireless tag TG.

In ACT26, the processor 10 causes the wireless communication device 60 to end the operation to stop reading the wireless tag TG designating the A value as the flag state.

In ACT27, the processor 10 notifies the end of reading by the output device 40. At this time, the calculation result of the position of the wireless tag TG to be detected may be notified together therewith. Further, this ACT27 may be omitted. The processor 10 ends this read operation.

Note that the processor 10 may transmit the position calculation result and reading end notification to the primary apparatus UE via the communication interface 70.

As described above, the processor 10 of the wireless tag communication apparatus 1 according to the first embodiment transmits, by the wireless communication device 60 that includes a flag for storing a flag state of one of the first state such as the A value and the second state such as the B value and returns, upon receiving a read command designating a flag state, identification information only in the case where the flag state corresponds to the designated flag state, and communicates with the wireless tag TG, a read command designating the first state as the flag state, and acquires identification information returned from the wireless tag whose flag state is the first state. The processor 10 then determines, on the basis of the acquired identification information, whether or not the position of the wireless tag TG that has returned identification information has been detected, and instructs, in the case where the position of the wireless tag TG that has returned identification information has been detected, the wireless tag TG that has returned identification information to rewrite the flag state to, for example, the B value that is the second state by the wireless communication device 60. As described above, in accordance with the wireless tag communication apparatus 1 according to the first embodiment, it is possible to allow the wireless tag TG whose position has been detected to not respond to a read command designating, for example, the A value that is the first state in the subsequent slots and rounds. For this reason, the wireless tags TG whose positions have been detected do not reduce the chances of reading the wireless tag TG whose position has not been detected. That is, the chances of reading the wireless tag TG whose position has not been detected increase as compared with the existing reading method. Therefore, in accordance with the wireless tag communication apparatus 1 according to the first embodiment, it is possible to shorten the time it takes to read all wireless tags whose positions are to be detected.

Note that the wireless tag TG is designed to rewrite, after returning identification information, the flag state from the first state such as the A value to the second state such as the B value. In this regard, in the wireless tag communication apparatus 1 according to the first embodiment, the processor 10 transmits, to the wireless tag determined not to be the wireless tag TG whose position is to be detected, a no-flag-change instruction for instructing not to rewrite the flag state to the B value, and cause the wireless tag TG determined to be the wireless tag whose position is to be detected to rewrite the flag state to the B value by not transmitting a no-flag-change instruction to the wireless tag TG. In this way, the wireless tag communication apparatus 1 according to the first embodiment operates in accordance with specifications of the wireless tag TG.

Further, the wireless tag communication apparatus 1 according to the first embodiment further includes the detection target storage unit 21 that is a storage unit that stores, in association with identification information of each of one or more wireless tags TG whose positions are to be detected, detected information indicating whether or not the position of the wireless tag TG has been detected. The processor 10 determines, on the basis of the detected information stored in the detection target storage unit 21 in association with the acquired identification information, whether or not the wireless tag TG that has returned identification information is a wireless tag whose position has been detected and is to be detected, and instructs the wireless tag TG whose position has been detected and is to be detected to rewrite the flag state to, for example, the B value that is the second state. Therefore, in accordance with the wireless tag communication apparatus 1 according to the first embodiment, it is possible to easily determine whether or not the wireless tag TG that has returned identification information is a wireless tag whose position has been detected and is to be detected, and allow the wireless tag TG whose position has been detected and is to be detected to not respond to a read command designating the A value in subsequent slots and rounds.

Further, in the wireless tag communication apparatus 1 according to the first embodiment, the processor 10 further determines, on the basis of whether or not the acquired identification information is stored in the detection target storage unit 21, whether or not the wireless tag TG that has returned identification information is the wireless tag whose position is to be detected, and instructs, in the case where the wireless tag TG that has returned identification information is not the wireless tag TG whose position is to be detected, the wireless tag TG that has returned identification information to rewrite the flag state to the B value. Therefore, in accordance with the wireless tag communication apparatus 1 according to the first embodiment, it is possible to allow the wireless tag TG whose position is not to be detected to not respond to a read command designating the A value in subsequent slots and rounds. As a result, since the wireless tag TG whose position is not to be detected does not reduce the chances of reading the wireless tag TG whose position is to be detected, it is possible to further shorten the time it takes to read all wireless tags whose positions are to be detected.

Further, the wireless tag communication apparatus 1 according to the first embodiment further includes the RSSI detector 63 and/or the phase detector 64 as a state detector that detects an RSSI and/or a phase, which is a communication state with the wireless tag TG by the wireless communication device 60. The processor 10 detects the position of the wireless tag TG on the basis of the detected communication state, and sets, in the case where the position of the wireless tag TG is detected, the detected information stored in the detection target storage unit 21 in association with the identification information of the wireless tag TG as position detected. Therefore, in accordance with the wireless tag communication apparatus 1 according to the first embodiment, by updating the content of the detection target storage unit 21 in accordance with the position detection of the wireless tag TG, it can be used to determine whether or not the wireless tag TG is a wireless tag TG whose position has been detected in subsequent slots and rounds.

Further, the wireless tag communication apparatus 1 according to the first embodiment further includes the position-correction-valid-flag storage unit 22 that is a setting storage unit that stores a position-correction-valid flag indicating a setting regarding whether or not the position of the wireless tag TG whose position has been detected is to be corrected. The processor 10 does not instruct, in the case where the setting stored in the position-correction-valid-flag storage unit 22 is a setting for correcting the position, the wireless tag TG whose position has been detected to rewrite the flag state to, for example, the B value that is the second state. Therefore, in accordance with the wireless tag communication apparatus 1 according to the first embodiment, by further using, even if the position of the wireless tag TG has been detected, position detection data obtained after that, it is possible to perform position detection with higher accuracy.

Further, the wireless tag communication system according to the first embodiment includes the wireless tag communication apparatus 1 according to the first embodiment and the primary apparatus UE that is connected to the wireless tag communication apparatus 1 and controls the wireless tag communication apparatus 1. The detection target storage unit 21 stores identification information of the wireless tag TG whose position is to be detected set from the primary apparatus UE. Therefore, in accordance with the wireless tag communication system according to the first embodiment, it is possible to easily set the wireless tag TG whose position is to be detected.

Second Embodiment

Next, a second embodiment will be described. Note that configurations and operations similar to those in the first embodiment will be denoted by similar reference symbols to those in the first embodiment, and description thereof will be omitted.

Figure 12:
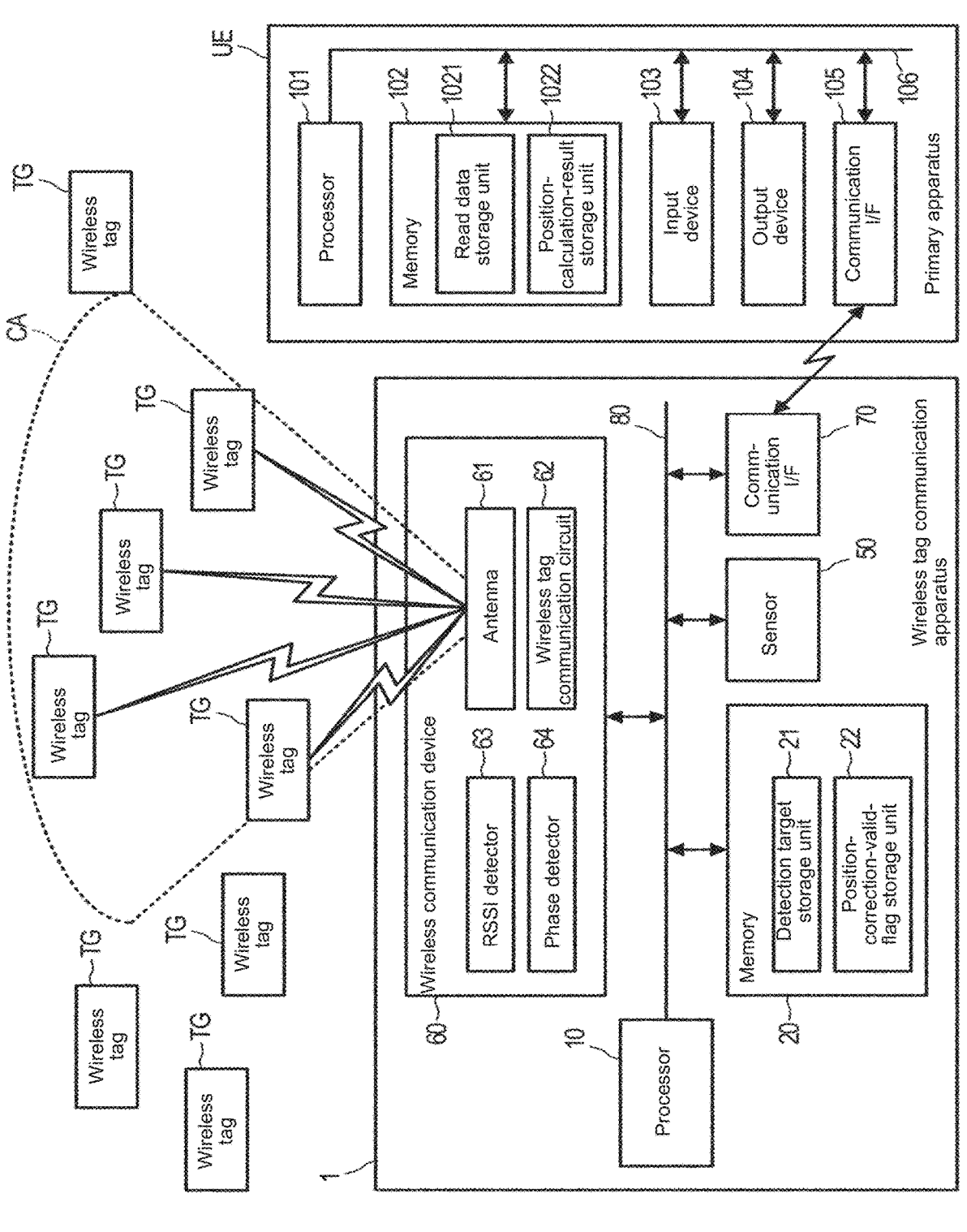
FIG. 12 is a schematic configuration diagram showing a wireless tag communication system according to a second embodiment.

FIG. 12 is a schematic configuration diagram showing a wireless tag communication system according to the second embodiment. In this embodiment, the wireless tag communication apparatus 1 according to the second embodiment and the primary apparatus UE cooperate with each other to detect the position of the wireless tag TG.

The wireless tag communication apparatus 1 includes the detection target storage unit 21 and the position-correction-valid-flag storage unit 22 in the memory 20. In this embodiment, the wireless tag communication apparatus 1 does not include the input device 30 and the output device 40.

The primary apparatus UE includes a processor 101, a memory 102, an input device 103, an output device 104, a communication interface 105, and a system transmission path 106. Note that also in FIG. 12, the "interface" is abbreviated as "I/F". The system transmission path 106 includes an address bus, a data bus, a control signal line, and the like. The system transmission path 106 connects the processor 101 and the other units to each other directly or via a signal input/output circuit and transmits data signals transmitted/received therebetween. The processor 101 and the memory 102 are connected to each other via the system transmission path 106, thereby configuring a computer of the primary apparatus UE. The memory 102 includes a read data storage unit 1021 and a position-calculation-result storage unit 1022. The read data storage unit 1021 and the position-calculation-result storage unit 1022 respectively correspond to the read data storage unit 23 and the position-calculation-result storage unit 24 in the first embodiment. The input device 103 is an operation switch, an operation button, or the like, and the output device 104 is a display device such as a liquid crystal display and an LED, or a sound device such as a buzzer and a speaker. Further, the input device 103 and the output device 104 may be configured as a touch panel in which touch keys are disposed on a display screen such as a liquid crystal display.

Figure 13:
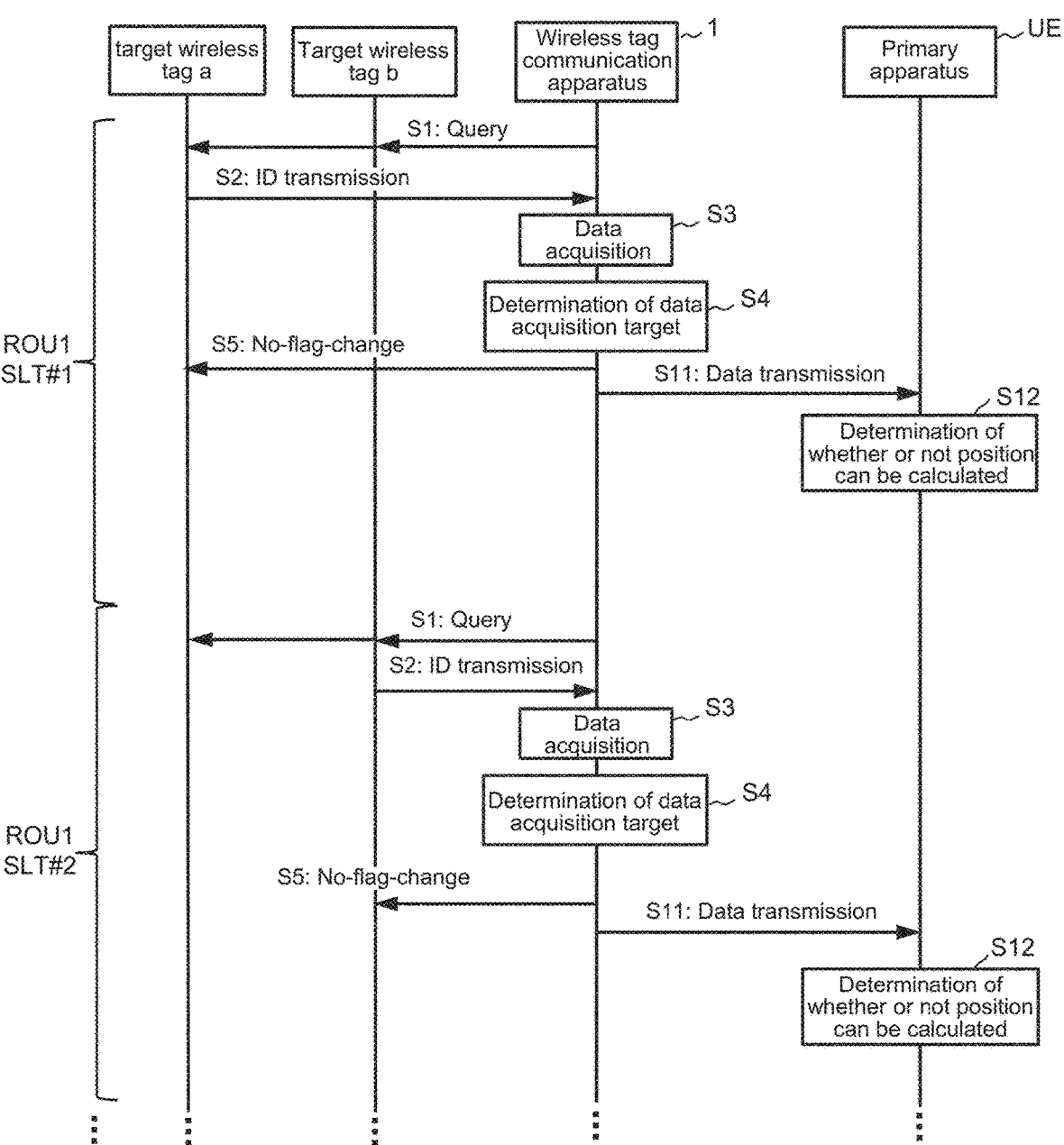
FIG. 13 is a sequence diagram showing an overview of an operation of the wireless tag communication system.
Figure 14:
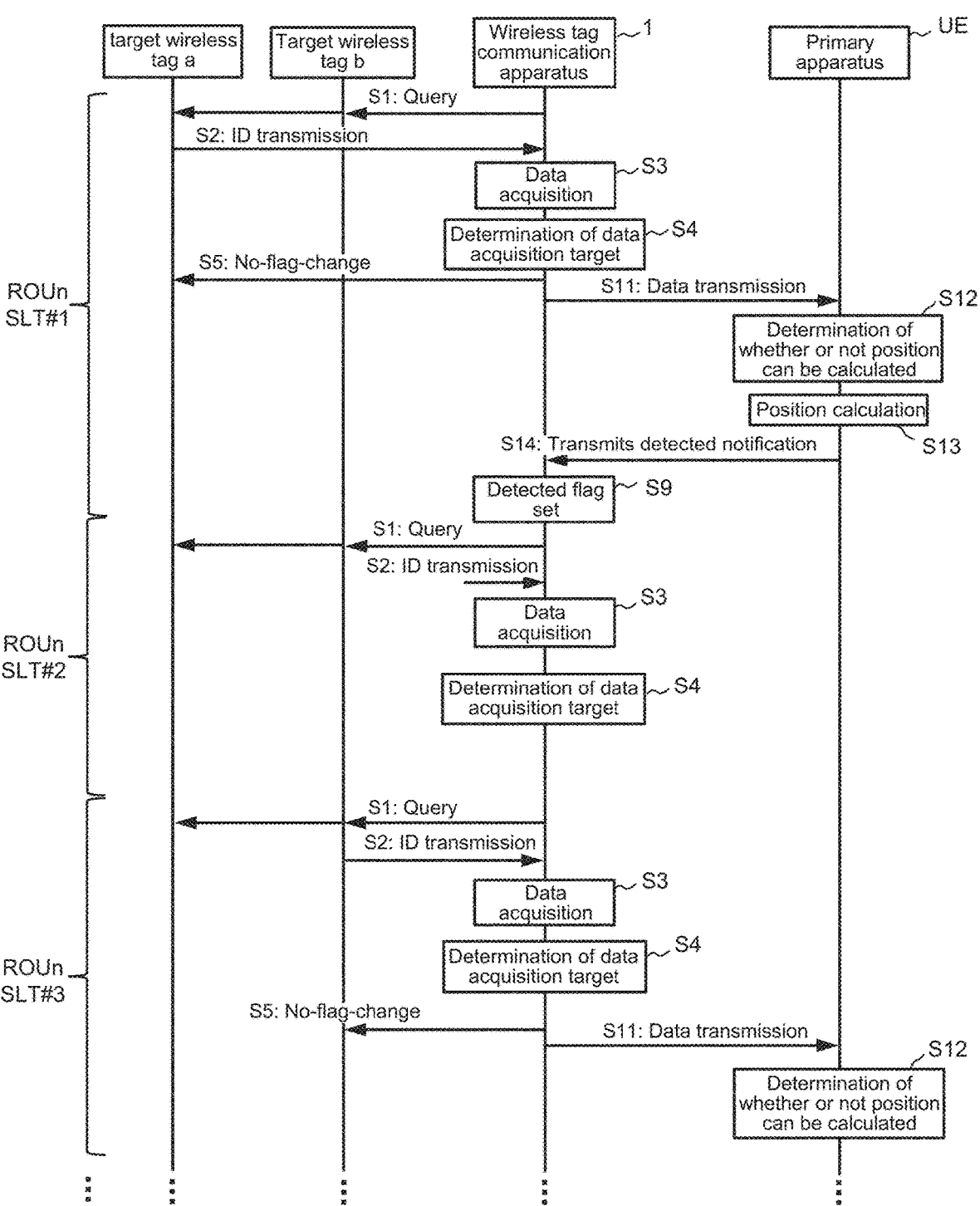
FIG. 14 is a sequence diagram showing an overview of an operation of the wireless tag communication system.

FIG. 13 and FIG. 14 are each a sequence diagram showing an overview of an operation of a wireless tag communication system. FIG. 13 shows the round 1 (ROU1) of reading, and FIG. 14 shows the round n (ROUn) of reading. In FIG. 13 and FIG. 14, assumption is made that a target wireless tag a whose identification information (tag ID) is "a", a target wireless tag b whose identification information is "b", . . . , enter the communication area CA. Note that although non-target wireless tags TG are not shown due to space limitations, such non-target wireless tags TG enter the communication area CA in some cases. Note that FIG. 13 and FIG. 14 show an ideal case where the counter values do not collide with each other. Actually, the wireless tag communication apparatus 1 does not receive identification information (tag ID) in some cases due to the collision of the counter values of the plurality of wireless tags TG.

As shown in FIG. 13, in the slot 1 (SLT #1) of the round 1 (ROU1), the wireless tag communication apparatus 1 transmits a query to the wireless tag TG entering the communication area CA (Step S1), and, for example, the target wireless tag a transmits identification information (tag ID) to the wireless tag communication apparatus 1 (Step S2).

The wireless tag communication apparatus 1 acquires, upon receiving the identification information transmitted from the target wireless tag a, position detection data, i.e., an acquisition time, an RSSI, and a phase (Step S3). The wireless tag communication apparatus 1 determines, on the basis of the content stored in the detection target storage unit 21, whether or not the received identification information is an acquisition target of position detection data (Step S4), and instructs, in the case where the received identification information is a data acquisition target, the target wireless tag a on a no-flag-change (Step S5).

The wireless tag communication apparatus 1 transmits the received identification information of the target wireless tag a and the acquired position detection data to the primary apparatus UE (Step S11). The primary apparatus UE receives these pieces of data, and stores the position detection data in the read data storage unit 1021 in association with the identification information. Note that the wireless tag communication apparatus 1 may transmit the detection result of the sensor 50 acquired in Step S3 to the primary apparatus UE without calculating an apparatus position, and the primary apparatus UE may calculate an apparatus position.

The primary apparatus UE then determines whether or not the position of the target wireless tag a having the received identification information can be calculated from the data stored in the read data storage unit 1021 (Step S12). The operation of this Step S12 corresponds to Step S6 in the first embodiment. In the case where the position cannot be calculated, the primary apparatus UE ends the processing of this slot.

In the next slot 2 (SLT #2), the subsequent remaining slots, and slots of subsequent rounds, similarly, the wireless tag communication apparatus 1 acquires identification information of the wireless tag TG whose position is to be detected and position detection data, and the primary apparatus UE stores them.

As shown in FIG. 14, in the slot 1 (SLT #1) of the round n (ROUn), the wireless tag communication apparatus 1 transmits a query to the wireless tag TG entering the communication area CA (Step S1), and, for example, the target wireless tag a transmits identification information (tag ID) to the wireless tag communication apparatus 1 (Step S2).

The wireless tag communication apparatus 1 acquires position detection data upon receiving the identification information transmitted from the target wireless tag a (Step S3), and determines, on the basis of the content stored in the detection target storage unit 21, whether or not the received identification information is an acquisition target of position detection data (Step S4). In the case where the received identification information is a data acquisition target, the wireless tag communication apparatus 1 instructs the target wireless tag a on a no-flag-change (Step S5). The wireless tag communication apparatus 1 transmits the received identification information of the target wireless tag a and the acquired position detection data to the primary apparatus UE (Step S11).

The primary apparatus UE stores the received position detection data in the read data storage unit 1021 in association with the received identification information, and determines whether or not the position of the target wireless tag a can be calculated from the data stored in the read data storage unit 1021 (Step S12).

In the case where the position can be calculated, the primary apparatus UE calculates the position of the target wireless tag a on the basis of the position detection data stored in the read data storage unit 1021 (Step S13). The primary apparatus UE stores the calculated position of the target wireless tag a in the position-calculation-result storage unit 1022. The operation of this Step S13 corresponds to Step S8 in the first embodiment.

In the case where the position can be calculated in this way, the primary apparatus UE transmits a detected notification to the wireless tag communication apparatus 1 (Step S14).

The wireless tag communication apparatus 1 that has received the detected notification sets the detection flag associated with the identification information of the target wireless tag a that is the corresponding wireless tag TG in the detection target storage unit 21 as detected (Step S9). The wireless tag communication apparatus 1 then ends the processing of this slot. As a result, in one slot of the round n+1 (ROUn+1) (not shown) that is the next round of the round n (ROUn), when receiving the identification information of the target wireless tag a, the wireless tag communication apparatus 1 determines, in the determination of whether or not it is an acquisition target of position detection data in Step S4, that it is not an acquisition target because the detection flag is set as detected. For this reason, a no-flag-change is not transmitted to the target wireless tag a, and the flag state of the target wireless tag a is rewritten from the A value to the B value upon receiving a query in the next slot.

In the next slot 2 (SLT #2), the wireless tag communication apparatus 1 transmits a query (Step S1). When one wireless tag TG (not shown), e.g., the non-target wireless tag TG transmits identification information (tag ID) to the wireless tag communication apparatus 1 in response to this query (Step S2), the wireless tag communication apparatus 1 acquires position detection data (Step S3). Further, the wireless tag communication apparatus 1 determines, on the basis of the received identification information, whether or not it is an acquisition target of position detection data (Step S4). In the case where it is not a data acquisition target, the wireless tag communication apparatus 1 does not instruct this non-target wireless tag that is not a data acquisition target on a no-flag-change. The wireless tag communication apparatus 1 then ends the processing of this slot.

In the next slot 3 (SLT #3), the wireless tag communication apparatus 1 transmits a query (Step S1). When, for example, the target wireless tag b transmits identification information (tag ID) to the wireless tag communication apparatus 1 in response to this query (Step S2), the wireless tag communication apparatus 1 acquires position detection data (Step S3). Further, the wireless tag communication apparatus 1 determines, on the basis of the received identification information, whether or not it is an acquisition target of position detection data (Step S3). In the case where it is a data acquisition target, the wireless tag communication apparatus 1 instructs the target wireless tag b on a no-flag-change (Step S5). The wireless tag communication apparatus 1 transmits the received identification information of the target wireless tag b and the acquired position detection data to the primary apparatus UE (Step S11).

The primary apparatus UE stores the received position detection data in the read data storage unit 1021 in association with the received identification information, and determines whether or not the position of the target wireless tag b can be calculated from the data stored in this read data storage unit 1021 (Step S12). In the case where the position cannot be calculated, the primary apparatus UE ends the processing in this slot.

After that, similarly, the processing of the remaining slots and slots of subsequent rounds is performed until all positions of the wireless tags TG of the identification information stored in the detection target storage unit 21 are calculated.

Figure 15:
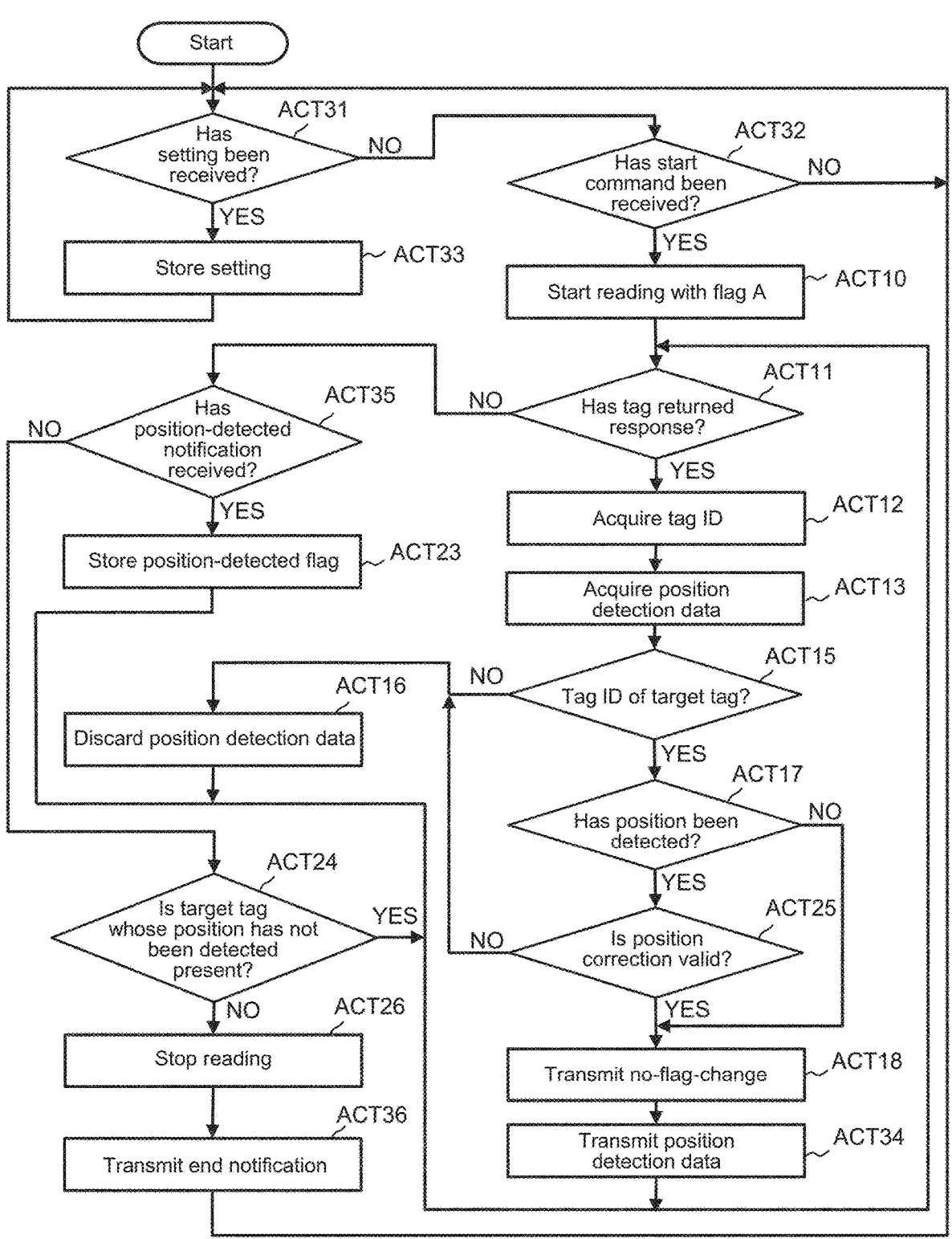
FIG. 15 is a flowchart showing information processing executed by a processor of the wireless tag communication apparatus according to the second embodiment.
Figure 16:
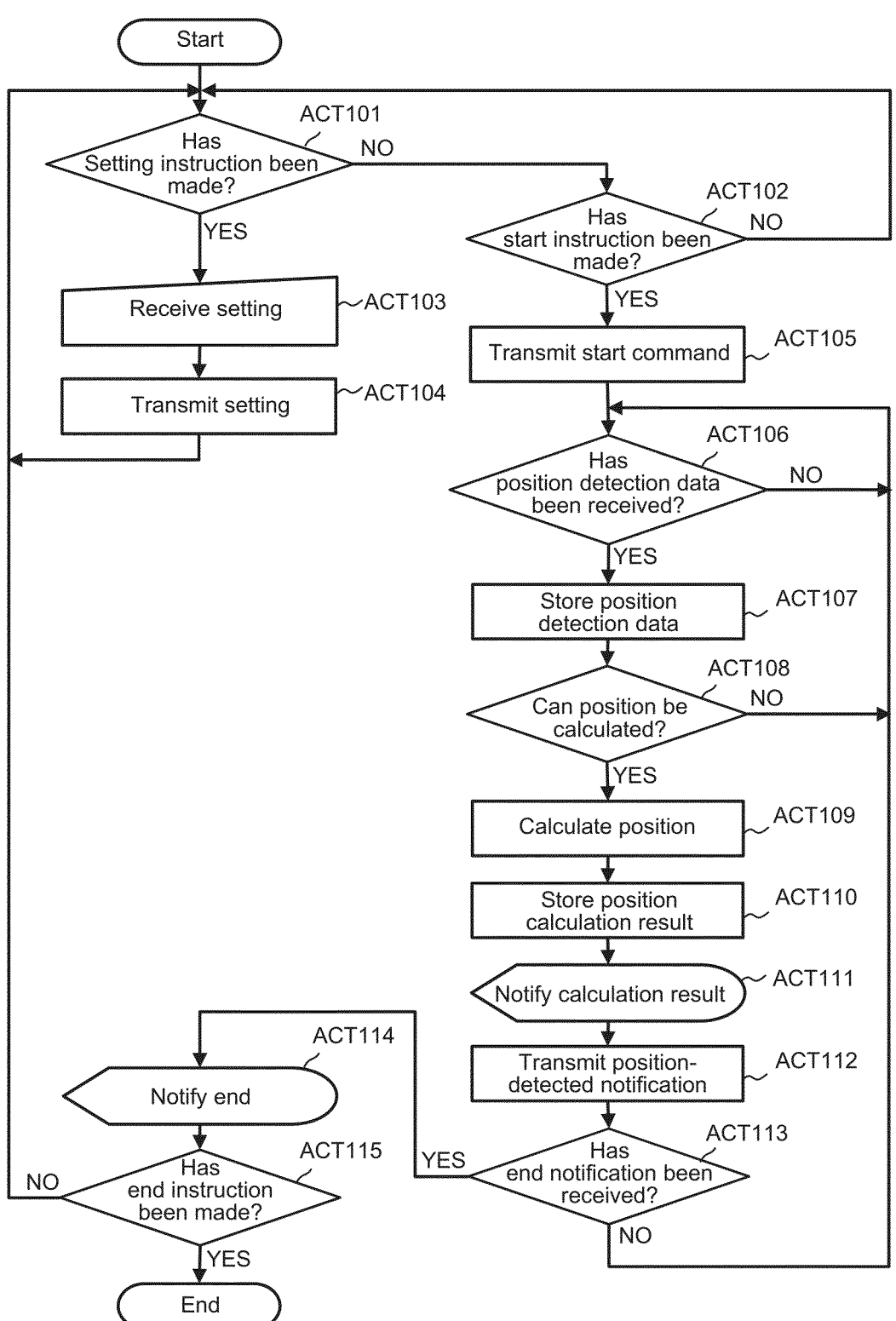
FIG. 16 is a flowchart showing information processing executed by a processor of a primary apparatus in the wireless tag communication system.

Next, a specific example of the operations of the wireless tag communication apparatus 1 and the primary apparatus UE will be described. FIG. 15 is a flowchart showing a main procedure of the information processing executed by the processor 10 of the wireless tag communication apparatus 1. The processor 10 of the wireless tag communication apparatus 1 executes this processing on the control program stored in the memory 20 when the power source is turned on. Further, FIG. 16 is a flowchart showing a main procedure of information processing executed by the processor 101 of the primary apparatus UE. The processor 101 of the primary apparatus UE executes this processing on the basis of the control program stored in the memory 102 as an application program in accordance with the start operation by the input device 103 that activates the control program, for example. Note that the procedure shown in FIG. 15 and FIG. 16 is merely an example, and the procedure is not particularly limited as long as similar results can be achieved.

As shown in FIG. 15, in ACT31, the processor 10 of the wireless tag communication apparatus 1 determines whether or not a setting from the primary apparatus UE has been received by the communication interface 70. In the case where a setting from the primary apparatus UE has been received, the processor 10 determines YES in ACT31, and the processing proceeds to ACT33. Further, in the case where a setting from the primary apparatus UE has not been received, the processor 10 determines NO in ACT31, and the processing proceeds to ACT32.

In ACT32, the processor 10 determines whether or not a start command for starting position detection of the wireless tag TG whose position is to be detected has been received from the primary apparatus UE by the communication interface 70. In the case where a start command has been received from the primary apparatus UE, the processor 10 determines YES in ACT32, and the processing proceeds to ACT10. Further, in the case where a start command has not been received from the primary apparatus UE, the processor 10 determines NO in ACT32, and the processing proceeds to ACT31.

As shown in FIG. 16, in ACT101, the processor 101 of the primary apparatus UE determines whether or not a setting instruction has been made by an operation of the input device 103 from a user. In the case where a setting instruction has been made, the processor 101 determines YES in ACT101, and the processing proceeds to ACT103. In the case where a setting instruction has not been made, the processor 101 determines NO in ACT101, and the processing proceeds to ACT102.

In ACT102, the processor 101 determines whether or not a start instruction of position detection of the wireless tag TG whose position is to be detected has been made by an operation of the input device 103 from a user. In the case where a start instruction of position detection has been made, the processor 101 determines YES in ACT102, and the processing proceeds to ACT105. In the case where a start instruction of position detection has not been made, the processor 101 determines NO in ACT102, and the processing proceeds to ACT101.

In ACT103, the processor 101 receives a setting by an operation of the input device 103 from a user. The setting content is designation of the wireless tag TG whose position is to be detected and designation of whether the position correction is valid or invalid. Designation of the wireless tag TG whose position is to be detected may be made by directly inputting identification information, or may be made in any form, e.g., a list of the wireless tags TG that can be designated is displayed on the display device that is the output device 104 and one wireless tag TG is selected from the list.

In ACT104, the processor 101 transmits the received setting content to the wireless tag communication apparatus 1 via the communication interface 105. After that, the processing of the processor 101 proceeds to ACT101.

As shown in FIG. 15, in ACT33, the processor 10 of the wireless tag communication apparatus 1 stores the setting content transmitted from the primary apparatus UE in the detection target storage unit 21 and the position-correction-valid-flag storage unit 22. After that, the processing of the processor 10 proceeds to ACT31.

As shown in FIG. 16, in ACT105, the processor 101 of the primary apparatus UE transmits a start command to the wireless tag communication apparatus 1 to the communication interface 105.

In ACT106, the processor 101 determines whether or not the position detection data transmitted from the wireless tag communication apparatus 1 has been received by the communication interface 105. In the case where the position detection data has been received, the processor 101 determines YES in ACT106, and the processing proceeds to ACT107. In the case where the position detection data has not been received, the processor 101 determines NO in ACT106, and repeats this ACT106 again. In this way, the processor 101 stands by until position detection data is received.

As shown in FIG. 15, in ACT10, the processor 10 of the wireless tag communication apparatus 1 starts reading the wireless tag TG designating the A value as the flag state, as described in the first embodiment.

In ACT11, the processor 10 determines whether or not any wireless tag TG has returned a response, as described in the first embodiment. In the case where a response has been returned, the processor 10 determines YES in ACT11, and the processing proceeds to ACT12. Further, in the case where a response has not been returned, the processor 10 determines NO in ACT11, and the processing proceeds to ACT35 in this embodiment.

In ACT12, the processor 10 acquires the tag ID of the wireless tag TG that has returned a response and stores the tag ID received by the wireless communication device 60, i.e., identification information in the work area of the memory 20, as described in the first embodiment.

In ACT13, the processor 10 acquires position detection data, as described in the first embodiment. Specifically, the processor 10 acquires a time and detects an RSSI and a phase by the RSSI detector 63 and the phase detector 64 of the wireless communication device 60. Further, the processor 10 calculates the position and orientation of the wireless tag communication apparatus 1, more specifically, the antenna 61, on the basis of the detection result of the sensor 50. Alternatively, the processor 10 does not necessarily need to calculate the position and orientation of the antenna 61. After that, in this embodiment, the processing of the processor 10 proceeds to ACT15.

In ACT15, the processor 10 determines whether or not the received tag ID is a tag ID of the wireless tag TG whose position is to be detected, as described in the first embodiment. In the case where the received tag ID is a tag ID of the wireless tag TG whose position is to be detected, the processor 10 determines YES in ACT15, and the processing proceeds to ACT16. Further, in the case where the received tag ID is not a tag ID of the wireless tag TG whose position is to be detected, the processor 10 determines NO in ACT15, and the processing proceeds to ACT16.

In ACT16, the processor 10 discards the position detection data stored in the read data storage unit 23. After that, the processing of the processor 10 proceeds to ACT11.

In ACT17, the processor 10 determines whether or not the position of the wireless tag TG determined as a wireless tag whose position is to be detected has been detected, as described in the first embodiment. In the case where the position has been detected, the processor 10 determines YES in ACT17, and the processing proceeds to ACT25. In the case where the position has not been detected, the processor 10 determines NO in ACT17, and the processing proceeds to ACT18.

In ACT18, the processor 10 transmits a no-flag-change instruction for instructing the wireless tag TG whose position is to be detected to not rewrite the flag state by the wireless communication device 60. After that, in this embodiment, the processing of the processor 10 proceeds to ACT34.

In ACT34, the processor 10 transmits, by the communication interface 70, the acquired position detection data together with the tag ID stored in the work area, i.e., identification information, to the primary apparatus UE. Note that the position detection data includes, in the case where the position and orientation of the antenna 61 are calculated in ACT13, the calculated position and orientation, and includes, in the case where the position and orientation are not calculated, the detection result of the sensor 50. After that, the processing of the processor 10 proceeds to ACT11. The communication interface 70 is an example of an interface device that transmits an RSSI and/or a phase, which is a communication state detected by the RSSI detector 63 and/or the phase detector 64 as the state detector that detects a communication state with the wireless tag TG by the wireless communication device 60, to the primary apparatus UE that is a detection device that detects the position of the wireless tag TG on the basis of this communication state.

As shown in FIG. 16, in ACT107, the processor 101 of the primary apparatus UE stores the received position detection data in the read data storage unit 1021 in association with the received tag ID, i.e., identification information. The operation of this ACT107 corresponds to ACT14 in the first embodiment.

In ACT108, the processor 101 determines whether or not the position of the wireless tag TG can be detected on the basis of the position detection data stored in the read data storage unit 1021. In the case where the position can be calculated, the processor 101 determines YES in ACT108, the processing proceeds to ACT109. In the case where the position cannot be calculated, the processor 101 determines NO in ACT108, and the processing proceeds to ACT106. The operation of this ACT108 corresponds to ACT19 in the first embodiment.

In ACT109, the processor 101 calculates the position of the wireless tag TG on the basis of the position detection data stored in the read data storage unit 1021. The operation of this ACT109 corresponds to ACT20 in the first embodiment.

In ACT110, the processor 101 stores the calculated position in the position-calculation-result storage unit 1022 in association with the identification information of the wireless tag TG. The operation of this ACT110 corresponds to ACT21 in the first embodiment.

In ACT111, the processor 101 notifies the calculation result by the output device 104. The operation of this ACT111 corresponds to ACT22 in the first embodiment.

In ACT112, the processor 101 transmits a position-detected notification to the wireless tag communication apparatus 1 via the communication interface 105. This position-detected notification includes the tag ID that is the identification information of the wireless tag TG whose position has been detected.

In ACT113, the processor 101 determines whether or not an end notification has been received from the wireless tag communication apparatus 1 by the communication interface 105. In the case where the end notification has been received, the processor 101 determines YES in ACT113, and the processing proceeds to ACT114. In the case where the end notification has not been received, the processor 101 determines NO in ACT113, and the processing proceeds to ACT106.

As shown in FIG. 15, in ACT35, the processor 10 of the wireless tag communication apparatus 1 determines whether or not the position-detected notification from the primary apparatus UE has been received by the communication interface 70. In the case where the position-detected notification has been received, the processor 10 determines YES in ACT35, and the processing proceeds to ACT23. In the case where the position-detected notification has not been received, the processor 10 determines NO in ACT35, and the processing proceeds to ACT24. The communication interface 70 is an example of an interface device that receives a position-detected notification indicating the wireless tag TG whose position has been detected from the primary apparatus UE.

In ACT23, the processor 10 stores the position-detected flag. Specifically, the processor 10 sets the detection flag stored in the detection target storage unit 21 in association with the identification information of the wireless tag TG whose position has been detected, which is included in the position-detected notification, as detected. The processor 10 is an example of a storage control function unit that sets the detected information stored in the detection target storage unit 21 in association with the identification information of the wireless tag TG as position detected. After that, in this embodiment, the processing of the processor 10 proceeds to ACT11.

In ACT24, the processor 10 determines whether or not a target wireless tag whose position has not been detected is present, as described in the first embodiment. In the case where a target wireless tag whose position has not been detected is present, the processor 10 determines YES in ACT24, and the processing proceeds to ACT11. Note that at this time, if one round ends, the next round is started. In the case where a target wireless tag whose position has not been detected is not present, the processor 10 determines NO in ACT24, and the processing proceeds to ACT26.

In ACT25, the processor 10 determines whether or not the position correction is valid, as described in the first embodiment. In the case where the position correction is not valid, the processor 10 determines NO in ACT25, and the processing proceeds to ACT16. In the case where the position correction is valid, the processor 10 determines YES in ACT25, and the processing proceeds to ACT18.

In ACT26, the processor 10 causes the wireless communication device 60 to end the operation to stop reading the wireless tag TG designating the A value as the flag state, as described in the first embodiment. After that, in this embodiment, the processing of the processor 10 proceeds to ACT36.

ACT36, the processor 10 transmits an end notification to the primary apparatus UE by the communication interface 70. After that, the processing of the processor 10 proceeds to ACT31.

As shown in FIG. 16, in ACT114, the processor 101 of the primary apparatus UE notifies the end of reading by the output device 104.

In ACT115, the processor 101 determines whether or not an end instruction by an operation of the input device 103 from a user has been made. In the case where an end instruction has not been made, the processor 101 determines NO in ACT115, and the processing proceeds to ACT101. In the case where an end instruction has been made, the processor 101 determines YES in ACT115, and ends the processing of the control program as an application program.

Further, a user can end the operation of the processor 101 of the wireless tag communication apparatus 1 shown in FIG. 15 by turning off the power source of the wireless tag communication apparatus 1.

As described above, in accordance with the wireless tag communication apparatus 1 according to the second embodiment, an RSSI and/or a phase, which is a communication state detected by the RSSI detector 63 and/or the phase detector 64 as the that detects a state detector communication state with the wireless tag TG by the wireless communication device 60, is transmitted to the primary apparatus UE that is a detection device that detects the position of the wireless tag TG on the basis of this communication state, and the processor 10 sets, in the case where the communication interface 70 as an interface unit that receives a position-detected notification indicating the wireless tag TG whose position has been detected from the primary apparatus UE has received a position-detected notification, the detected information stored in the detection target storage unit 21 in association with the identification information of the wireless tag TG as position detected. Therefore, in accordance with the wireless tag communication apparatus 1 according to the second embodiment, it is possible to update the content the detection target storage unit 21 in accordance with the position detection of the wireless tag TG in the primary apparatus UE, and it can be used to determine whether or not the wireless tag TG is a wireless tag TG whose position has been detected in subsequent slots and rounds.

Further, in accordance with the wireless tag communication system according to the second embodiment, the processing of detecting the position of the wireless tag TG on the basis of the RSSI and/or the phase, which is a communication state with the wireless tag TG, is performed by the primary apparatus UE connected to the wireless tag communication apparatus 1. Even in this case, similarly to the first embodiment, it is possible to allow the wireless tag TG whose position has been detected to not respond to a read command designating, for example, the A value that is the first state in subsequent slots and rounds. Therefore, the wireless tags TG whose positions have been detected do not reduce the chances of reading the wireless tag TG whose position has not been detected. That is, since the chances of reading the wireless tag TG whose position has not been detected increase as compared with the existing reading method, it is possible to shorten the time it takes to read all wireless tags whose positions are to be detected, in accordance with the wireless tag communication apparatus 1 according to the first embodiment. Further, by causing the primary apparatus UE that is an information processing apparatus such as a server computer and an information processing device such as a smartphone to execute particularly the processing of detecting a position, which requires a high processing capacity, it is possible to use an inexpensive processor that does not have a high processing capacity as the processor 10 of the wireless tag communication apparatus 1 and reduce the cost of the wireless tag communication apparatus 1.

Although embodiments of a wireless tag communication system and a wireless tag communication apparatus has been described, the embodiments are not limited thereto. For example, ACT21 and ACT23 in the flowchart of FIG. 11 may be performed in reverse order or in parallel. In this way, the order of processing may be changed or a plurality of processes may be performed in parallel as long as there is no discrepancy with the preceding or subsequent processing.

Note that in the above embodiment, the control program executed by the processor 10 of the wireless tag communication apparatus 1 or the processor 101 of the primary apparatus UE may be recorded on a computer-readable non-transitory recording medium such as a CD-ROM and provided. Further, the control program may be stored in a computer connected to a network such as the Internet and provided by being downloaded through the network.

Further, each function of the above embodiment can be realized by one or more processing circuits. Note that the "processing g circuit" in the present specification includes a processor programmed to perform each function using software, such as a processor implemented by an electronic circuit, and a device such as an application specific integrated circuit (ASIC), a digital signal processor (DSP), a field programmable gate array (FPGA), and an existing circuit module designed to execute each function described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication apparatus, comprising:

a wireless communication device that transmits, to wireless tags, a sequence of read commands for reading identification information of the wireless tags and receives the identification information from the wireless tags, each read command in the sequence designating a flag state of a flag set in the wireless tag, the flag state being set to one of a first state when reading is incomplete and a second state when reading is complete, each of the wireless tags returning the identification information upon receiving a corresponding one of the read commands in the sequence that designates the flag state only where the flag state corresponds to the designated flag state; and a processor configured to transmit, by the wireless communication device, a first read command designating the first state as the flag state and acquire, by the wireless communication device, the identification information returned from a first wireless tag of the wireless tags whose flag state is the first state, determine, on a basis of the acquired identification information, whether or not a position of the first wireless tag has been detected, where it is determined that the position of the first wireless tag has not been detected, transmit, by the wireless communication device, an instruction that instructs the first wireless tag to maintain the flag state to be the first state, and where it is determined that the position of the first wireless tag has been detected, transmit, by the wireless communication device, a second read command designating the first state as the flag state without transmitting the instruction, the second read command causing the first wireless tag to rewrite the flag state to the second state.

2. The wireless tag communication apparatus according to claim 1, further comprising a memory that includes a detection target storage unit that stores detected information in association with identification information of each of one or more wireless tags whose positions are to be detected, the detected information indicating whether or not the position of the corresponding wireless tag has been detected, the processor being further configured to determine, on a basis of the detected information stored in the detection target storage unit of the memory in association with the acquired identification information, whether or not a wireless tag that has returned the identification information is a wireless tag whose position has been detected and is to be detected, and instruct a wireless tag that is determined to be the wireless tag whose position has been detected and is to be detected to rewrite the flag state to the second state.

3. The wireless tag communication apparatus according to claim 2, wherein the processor is further configured to determine, in accordance with whether or not the acquired identification information is stored in the detection target storage unit of the memory, the wireless tag that has returned the identification information is the wireless tag whose position is to be detected, and instruct, where the wireless tag that has returned the identification information is not the wireless tag whose position is to be detected, the wireless tag that has returned the identification information to rewrite the flag state to the second state by the wireless communication device.

4. The wireless tag communication apparatus according to claim 2, wherein the wireless communication device includes a state detector that detects a communication state with the wireless tag, and the processor is further configured to detect the position of the wireless tag on a basis of the communication state, and set, where the position of the wireless tag is detected, the detected information stored in the detection target storage unit of the memory in association with the identification information of the wireless tag as position detected.

5. The wireless tag communication apparatus according to claim 2, further comprising an interface that transmits the communication state to a detection device that detects a position of the wireless tag on a basis of the communication state with the wireless tag by the wireless communication device and receives, from the detection device, a detected notification indicating a wireless tag whose position has been detected, the wireless communication device including a state detector that detects a communication state with the wireless tag, the processor being further configured to set, where the interface has received the detected notification, the detected information stored in the detection target storage unit of the memory in association with the identification information of the wireless tag as position detected.

6. The wireless tag communication apparatus according to claim 1, wherein the wireless tag returns identification information and then rewrites the flag state from the first state to the second state, and the processor is further configured to transmit, to a wireless tag determined not to be the wireless tag whose position is to be detected, a no-flag-change instruction for instructing not to rewrite the flag state to the second state, and cause a wireless tag determined to be the wireless tag whose position is to be detected to rewrite the flag state to the second state by not transmitting the no-flag-change instruction.

7. The wireless tag communication apparatus according to claim 2, wherein the memory further includes a setting storage unit that stores a setting regarding whether or not a position of the wireless tag whose position has been detected is to be corrected, and the processor is further configured not to instruct, where the setting stored in the setting storage unit is a setting for correcting the position, the wireless tag whose position has been detected to rewrite the flag state to the second state.

8. The wireless tag communication apparatus according to claim 1, further comprising a memory that includes a read data storage unit that stores identification information read from a wireless tag whose position is to be detected, the processor being further configured to store the acquired identification information in the read data storage unit of the memory.

9. A wireless tag communication system that includes a wireless tag communication apparatus that communicates with wireless tags and a primary apparatus that is connected to the wireless tag communication apparatus and controls the wireless tag communication apparatus, comprising:

a wireless communication device that transmits, to the wireless tags, a sequence of read commands for reading identification information of the wireless tags and receives the identification information from the wireless tags, each read command in the sequence designating a flag state of a flag set in the wireless tag, the flag state being set to one of a first state when reading is incomplete and a second state when reading is complete, each of the wireless tags returning the identification information upon receiving a corresponding one of the read commands in the sequence that designates the flag state only where the flag state corresponds to the designated flag state;

a state detector that detects a communication state with the wireless tag by the wireless communication device;

a memory that includes a detection target storage unit that stores detected information in association with identification information of each of one or more wireless tags whose positions are to be detected, the detected information indicating whether or not the position of the corresponding wireless tag has been detected; and a processor configured to transmit, by the wireless communication device, a first read command designating the first state as the flag state and acquire, by the wireless communication device, the identification information returned from a first wireless tag of the wireless tags whose flag state is the first state, detect a position of the first wireless tag on a basis of the communication state detected by the state detector, determine, on a basis of the detected information stored in the detection target storage unit of the memory in association with the acquired identification information, whether or not a position of the first wireless tag has been detected, where it is determined that the position of the first wireless tag has not been detected, transmit, by the wireless communication device, an instruction that instructs the first wireless tag to maintain the flag state to be the first state, and where it is determined that the position of the first wireless tag has been detected, transmit, by the wireless communication device, a second read command designating the first state as the flag state, the second read command causing the first wireless tag to rewrite the flag state to the second state.

10. The wireless tag communication system according to claim 9, wherein the wireless tag communication apparatus includes the wireless communication device, the state detector, the memory, and the processor, and the detection target storage unit of the memory stores the identification information of the wireless tag whose position is to be detected set from the primary apparatus.

11. The wireless tag communication system according to claim 9, wherein the wireless tag communication apparatus includes the wireless communication device, the state detector, the memory, and the processor, the primary apparatus detects a position of the wireless tag on a basis of the communication state, and the detection target storage unit of the memory stores detected information in association with identification information of each of one or more wireless tags whose positions are to be detected by the primary apparatus, the detected information indicating whether or not the position of the corresponding wireless tag has been detected.

12. A communication method for a wireless tag communication apparatus, comprising:

transmitting, to wireless tags, a sequence of read commands for reading identification information of the wireless tags by a wireless communication device, each read command in the sequence designating a flag state of a flag set in the wireless tag, the flag state being set to one of a first state when reading is incomplete and a second state when reading is complete, each wireless tag returning the identification information upon receiving a corresponding one of the read commands in the sequence that designates the flag state only where the flag state corresponds to the designated flag state;

receiving the identification information from a first wireless tag of the wireless tags by the wireless communication device to acquire the identification information returned from the first wireless tag whose flag state is the first state;

determining, on a basis of the acquired identification information, whether or not a position of the first wireless tag has been detected;

where it is determined that the position of the first wireless tag has not been detected, transmitting, by the wireless communication device, an instruction that instructs the first wireless tag to maintain the flag state to be the first state; and where it is determined that the position of the first wireless tag has been detected, transmitting, by the wireless communication device, a second read command designating the first state as the flag state without transmitting the instruction, the second read command causing the first wireless tag to rewrite the flag state to the second state by the wireless communication device.

* * * * *